(12) United States Patent
Oshio

(10) Patent No.: US 8,879,685 B2
(45) Date of Patent: Nov. 4, 2014

(54) PEDOMETER FOR SHOE

(75) Inventor: Kozo Oshio, Kanagawa (JP)

(73) Assignee: Kozo Oshio, Kanagawa (JP)

( * ) Notice: Subject to any disclaimer, the term of this patent is extended or adjusted under 35 U.S.C. 154(b) by 0 days.

(21) Appl. No.: 13/610,885

(22) Filed: Sep. 12, 2012

(65) Prior Publication Data

US 2013/0028368 A1 Jan. 31, 2013

Related U.S. Application Data

(63) Continuation of application No. PCT/JP2011/056517, filed on Mar. 14, 2011.

(30) Foreign Application Priority Data

Mar. 16, 2010 (JP) .................................. 2010-059428
Apr. 16, 2010 (JP) .................................. 2010-095142

(51) Int. Cl.
*G01C 21/00* (2006.01)
*A43B 3/00* (2006.01)
*G01C 22/00* (2006.01)
*A43C 19/00* (2006.01)

(52) U.S. Cl.
CPC ............ *A43B 3/0005* (2013.01); *G01C 22/006* (2013.01); *A43C 19/00* (2013.01)
USPC ................. 377/24.2; 36/114; 36/132

(58) Field of Classification Search
CPC ..... G01C 22/006; A63B 69/0028; A43B 3/00
USPC ....................................... 377/24.2
See application file for complete search history.

(56) References Cited

U.S. PATENT DOCUMENTS

| 4,649,552 | A | * | 3/1987 | Yukawa | 377/24 |
| 5,640,786 | A | * | 6/1997 | Buyayez | 36/114 |
| 6,270,432 | B1 | * | 8/2001 | Matlock | 473/464 |
| 2009/0070067 | A1 | * | 3/2009 | Beer | 702/160 |
| 2009/0192759 | A1 | * | 7/2009 | Wedge | 702/160 |
| 2010/0292600 | A1 | * | 11/2010 | DiBenedetto et al. | 600/520 |

FOREIGN PATENT DOCUMENTS

| JP | S60-54403 U | 4/1985 |
| JP | S60-083404 A | 5/1985 |
| JP | S60-84688 A | 5/1985 |

(Continued)

OTHER PUBLICATIONS

International Search Report for International application No. PCT/JP2011/056517.

*Primary Examiner* — Christle I Marshall

(57) ABSTRACT

An electromotive unit that produces an electric current in response to a pressure applied thereto when a user lands the ground on his/her foot while walking or running, or a pressure detector that detects variation in the applied pressure is formed like a flat plate and arranged within a small space in a shoe. A wire material is provided to deliver, outside the shoe, the electric current produced in response to the pressure applied when the user lands the ground on his/her foot or a signal indicative of the variation in the applied pressure. The wire material is connected to a pedometer unit outside the shoe to perform counting. The wire material can be fixed and mounted onto a desired portion in the opening of the shoe by using a fastener or by being formed as a fixable wire material.

45 Claims, 34 Drawing Sheets

(56) References Cited

FOREIGN PATENT DOCUMENTS

| | | |
|---|---|---|
| JP | S60-084689 A | 5/1985 |
| JP | S60-084690 A | 5/1985 |
| JP | S60-83401 U | 6/1985 |
| JP | S60-155302 U | 10/1985 |
| JP | S60-155305 U | 10/1985 |
| JP | S60-194901 A | 10/1985 |
| JP | S60-200118 A | 10/1985 |
| JP | S60-200119 A | 10/1985 |
| JP | S60-200120 A | 10/1985 |
| JP | S61-87318 U | 6/1986 |
| JP | S61-294593 A | 12/1986 |
| JP | S62-162774 U | 10/1987 |
| JP | H02-036495 A | 2/1990 |
| JP | H05-93209 U | 12/1993 |
| JP | 2001-143049 A | 5/2001 |
| JP | 2002-119498 A | 4/2002 |
| JP | 2004-187808 A | 7/2004 |
| JP | 2007-300951 A | 11/2007 |

* cited by examiner

PEDOMETER FOR SHOE

BACKGROUND

1. Technical Field

The present invention relates to a pedometer for a shoe that is mountable on a ready-made shoe to detect steps during walking and running and to measure the number of walking and running steps.

2. Related Art

In the conventional art, a pedometer has been proposed which can be attached onto a body of a user and measures the number of steps while the user walks by detecting the movement of the body. The movement of the body, however, includes a variety of other ways of movement than walking. Therefore, the conventional pedometer may erroneously detect the movement of the body while the user is not walking, which may result in erroneous measurements. To eliminate such measurement errors, Japanese Utility Model Application Publication No. 05-093209 discloses an invention of measuring the number of steps based on detection of output from a piezoelectric element, for example.

The above-mentioned invention has encountered a problem. According to the invention, a piezoelectric transducer and a counting device are attached onto a shoe, and the number of steps cannot be measured unless the user wears the shoe that has been modified and has the piezoelectric transducer and the counting device mounted thereon. In reality, it is extremely difficult to mount the piezoelectric transducer and the counting device on the shoe. There is not much space in the shoe to accommodate the piezoelectric transducer and the counting device, the manufacturing cost is very high, the shoe cannot be washed, and the user is required to wear the particular shoe having the step number counting device mounted thereon to measure the number of steps and forced to purchase the same shoe if the shoe wears off. Although Japanese Utility Model Application Publication No. 05-093209 does not specifically mention the structure of the piezoelectric transducer arranged on the shoe sole, when the piezoelectric transducer, which is made of piezoelectric ceramic, is placed by itself on the shoe sole, the piezoelectric transducer may break due to the loading applied onto the piezoelectric transducer. Therefore, the invention disclosed in Japanese Utility Model Application Publication No. 05-093209 is infeasible.

Another proposal has been made in, for example, Japanese Patent Application Publication No. 2007-300951. According to this publication, a pressure detection sensor configured to detect a pressure is arranged in a shoe to count the number of steps by detecting variation in pressure applied to the pressure detection sensor. A shoe, however, has too severe problems, as discussed below, to accommodate, in the shoe, a pressure sensor, an impulse sensor, an apparatus and a power source to detect movement of the user's foot, and wirings to connect and link the above. Thus, the invention disclosed in Japanese Patent application Publication No. 2007-300951 is also infeasible, but the publication does not disclose at all how to implement the invention.

(1) The space inside a shoe is designed to accommodate a user's foot when the user wears the shoe and is very small. The space is actually too small to have therein a pressure sensor, an impulse sensor, an apparatus and a power source to detect the movement of the user's foot, and wirings to connect and link the above.

(2) Inside a shoe, a pressure is applied in any direction at any time at any portion because a user's foot moves as the user walks or runs. The pressure exerts tension directly on the wirings connected and linked in the shoe. This disconnects the contact between the wirings in the shoe or breaks the connections of the wirings. When connectors are used to establish connections, the connectors may also lose the contact therebetween, break or suffer from poor connection.

The problems that may arise in relation to wirings in a shoe are also specifically described in detail in Japanese Utility Model Application Publications Nos. 60-155302, 60-155305, and 60-83401. In a shoe, lead wires are arranged and connected to each other. If a user wears the shoe and moves in various manners (for example, walks, runs or jumps), tension is directly applied to the direct connections between the lead wires and sensors. This easily disconnects or degrades the direct connections. Accordingly, it has been very difficult to dispose wirings in a shoe. As a specific exemplary number of steps, a person may walk 10,000 steps per day. This person will walk 100,000 steps in 10 days, 1,000,000 steps in 100 days, and 3,650,000 steps in one year. This means that a pressure is applied in the shoe 3,650,000 times in one year due to the walking. The direct connections between the lead wires and the sensors are exposed to tension at least several hundred thousand times or more. Consequently, it has been extremely difficult to dispose lead wires in a shoe.

Additionally, the space inside a shoe is very dump and humid. If lead wires are disposed and connected in a shoe, the connections may easily rust and thus degrade. The connections between the lead wires and the sensors irrespective of whether the lead wires and the sensors are directly connected as discussed above or connected and fixed by using connectors (the resulting connections are made between the lead wires and the contact pins in the housings of the connectors) are exposed to tension as the shoe moves. Therefore, the connections may easily break, be degraded or disconnected as discussed above. As a consequence, it has been very difficult to arrange and connect wirings in a shoe.

(3) A user wearing a shoe may feel pain and uncomfortable if even a small stone is in the shoe. It has been thus very difficult to provide, in the shoe, a pressure sensor, and an apparatus and a power source to detect the movement of the user's foot without causing the user to feel uncomfortable.

TABLE 1

| Publication | How to connect sensors and lead wires | Whether to separately measure the number of walking and running steps |
| --- | --- | --- |
| JP 60-054403 (Utility Model) | Directly connect a code to a pressure sensor | No, Only measures the number of steps |
| JP 60-094688 (Patent) | Directly connect a lead wire to a sensor | No, Only measures the number of steps |
| JP 60-084689 (Patent) | Directly connect a lead wire to a sensor | No, Only measures the number of steps |
| JP 60-084690 (Patent) | Directly connect a lead wire to a piezoelectric sensor | No, Only measures the number of steps |
| JP 60-083404 (Patent) | Directly connect a code to a pressure sensor | No, Only measures the number of steps |
| JP 60-194901 (Patent) | Directly connect a lead wire to a sensor | No, Only measures the number of steps |
| JP 60-200118 (Patent) | Directly connect a lead wire to a sensor | No, Only measures the number of steps Recites: ". . . detects walking by detecting variation in loading caused when a user's foot lands the ground during walking or running, and outputs a signal indicating the detected result to a body 2 . . . ," and thus disclose that only the number of steps is detected. The variation in |

TABLE 1-continued

| Publication | How to connect sensors and lead wires | Whether to separately measure the number of walking and running steps |
|---|---|---|
| JP 60-200119 (Patent) | Directly connect a lead wire to a sensor | loading is detected between "1" and "0," not linearly. No, Only measures the number of steps Distinguishes walking and running by detecting the period of a foot landing the ground, does not detect the level of the pressure, and thus cannot detect fast walking such as competitive walking, where both feet land the ground. |
| JP 60-200120 (Patent) | Provide a sensor on a tongue flap, No lead wire | No, Only measures the number of steps Detects variation in output between "1" and "0", not linearly. |
| JP 61-087318 (Patent) | No lead wire | No, Only measures the number of steps |
| JP 2001-143049 (Patent) | Directly connect a lead wire to a loading sensor | No, Only measures the number of steps |
| JP 2004-187808 (Patent) | Directly connect a measurement shaft to measuring means to detect a pressure applied on the bottom of a foot | Measures the pressure applied to the bottom of a foot and outputs the result of the measurement as a numerical value. To measure the pressure applied to the bottom of a foot, measures the amount of variation in length of the extensible measurement shaft. By detecting the pressure, the force to kick the ground is detected. The pressure is detected to understand the level of fatigue of a user. |

As discussed above, when a pressure sensor to detect a pressure and an impulse sensor are arranged in a shoe, the number of steps cannot be measured unless the user wears the shoe that already has been modified to have such sensors installed therein. As seen from Table 1, the conventional in-shoe pedometers also disadvantageously cannot distinguish walking and running and only detect and measure the number of steps.

PRIOR ART DOCUMENTS

Patent Documents

Patent Document 1: Japanese Utility Model Application Publication No. 05-093209
Patent Document 2: Japanese Patent Application Publication No. 2007-300951
Patent Document 3: Japanese Utility Model Application Publication No. 60-155302
Patent Document 4: Japanese Utility Model Application Publication No. 60-155305
Patent Document 5: Japanese Utility Model Application Publication No. 60-083401

The present invention is made in light of the problems described above in relation to the conventional art. According to the present invention, an electromotive unit or a pressure detector is detachably provided in a shoe on the shoe sole. The electromotive unit detects the amount of electric currents produced by the loading (pressure) applied to the bottom of a user's foot as the user's foot lands the ground during walking or running. On the other hand, the pressure detector detects variation in pressure exerted by the loading (pressure) applied to the bottom of the user's foot as the user's foot lands the ground during walking or running. The pedometer relating to the present invention is shaped as a flat plate and can be arranged on the show sole within a small space in a ready-made shoe without modifying the ready-made shoe. Thus, the pedometer relating to the present invention can be detachably mounted in any ready-made shoe, measure the variation in pressure or the amount of electric currents produced by the loading (pressure) applied to the bottom of the user's foot as the user walks or runs, does not suffer from wire breakage, poor connection or disconnected connection in the shoe, and can completely separately measure the number of walking steps and the number of running steps. Thus, the present invention provides a pedometer for a shoe that has never been realized in the conventional art.

SUMMARY

According to the present invention, to solve the problems described above, an electromotive unit is formed as a flat plate to be capable of being arranged on a shoe sole within a small space in a shoe. The electromotive unit is configured to produce an electric current in response to the pressure (loading) applied when a user wearing the shoe lands the ground on his/her foot while walking or running. The piezoelectric element in the electromotive unit is deformed and produces an electric current by the pressure applied when the foot is placed on the flat-plate-like electromotive unit. The electric current produced by the electromotive unit is delivered outside the shoe via a wire material, which is connected to a pedometer unit to measure the number of steps. The wire material is positioned in an empty space in the shoe and fixed by a fastener onto a desired portion in the opening of the shoe. Thus, the pedometer relating to the present invention is detachably mountable on a ready-made shoe. According to another embodiment, a fixable wire material is employed. The fixable wire material is fixed by clipping a desired portion in the opening of the shoe and is also configured to deliver an electric current. The fixable wire material enables the pedometer relating to this embodiment to be detachably mounted onto a ready-made shoe.

The flat-plate-like electromotive unit can be constituted by a piezoelectric electromotive unit having a flat and thin piezoelectric element on a flexible and flat-plate-like substrate. The flat-plate-like substrate is bent and deformed by a pressure applied when a foot lands on the substrate. The deformation of the substrate also bends the flat and thin piezoelectric element on the substrate and causes the piezoelectric element to produce an electric current.

Alternatively, a pressure detector is formed as a flat plate to be capable of being arranged on a shoe sole within a small space in a shoe. The pressure detector is configured to detect variation in pressure exerted by the pressure (loading) applied when the user wearing the shoe lands the ground on his/her foot while walking or running. The pressure detector can detect variation in output caused by the pressure applied when the foot is placed onto the flat-plate-like pressure detector. A signal indicative of the variation in output detected by the pressure detector is transmitted outside the shoe via a wire material, which is connected to a pedometer unit to measure the number of steps. The wire material is positioned in an empty space in the shoe and fixed by a fastener onto a desired portion in the opening of the shoe. Thus, the pedometer relating to the present invention is detachably mountable on a ready-made shoe. Alternatively, a fixable wire material is employed. The fixable wire material is fixed by clipping a desired portion in the opening of the shoe and is also configured to deliver an electric current. The fixable wire material enables the pedometer relating to this embodiment to be detachably mounted onto a ready-made shoe. Furthermore, the pedometer relating to the present invention separately detects and measures the number of walking steps and the number of running steps by referring to the amount of electric currents produced by the electromotive unit in response to the foot landing the ground while the user walks or runs, or to the variation in pressure detected by the pressure detector in response to the foot landing the ground while the user walks or runs.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

The pedometer for a shoe according to the present invention can be mounted on any ready-made shoe without any modification, can detect the amount of produced electric currents or the variation in pressure by placing the electromotive unit or the pressure detector of the pedometer on the shoe sole within any small shoe, and can be detachably fixed and mounted onto the shoe by means of a fastener or a fixable wire material. Since the pedometer for a shoe according to the present invention can be mounted on a desired portion in the opening of the shoe as desired by the user of the shoe, the pedometer can be positioned at the side or the back of the shoe and the position of the pedometer is thus freely selected. In the case of using the electromotive unit, the produced electric current can be measured without the use of a power source. Therefore, the battery serving as the power source is less consumed to measure the produced electric current, and a substantially longer lifetime can be achieved for the battery. According to the present invention, the electromotive unit and the pressure detector are formed like a flat plate and do not occupy much space. The electromotive unit and the pressure detector can be appropriately bent in proportion to the magnitude of the pressure (loading) or impact applied from above and thus may effectively function as a cushion to absorb the pressure (loading) or impact and mitigate the effect. The electromotive unit and the pressure detector can also be detachably mounted on a ready-made shoe. Furthermore, the present invention can detect the amount of electric currents produced by the piezoelectric electromotive unit, and the variation in pressure (loading) applied onto the pressure detector separately between when the user wearing the shoe walks and runs. The present invention can separately measure the number of walking steps and the number of running steps by separately storing in advance the amounts of electric currents produced during walking and running and the variations in pressure applied during walking and running. A conventional portable pedometer and a conventional pedometer mountable on a shoe have never been able to separately measure the number of walking steps and the number of running steps.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

The following describes in detail exemplary embodiments of the present invention with reference to the attached drawings. FIGS. 1A to 1D and FIGS. 2A to 2D are overall views illustrating exemplary embodiments of the pedometer for a shoe according to the present invention. FIGS. 3A to 3D illustrate exemplary embodiments of an electromotive unit of the pedometer for a shoe according to the present invention.

Figure 13A:
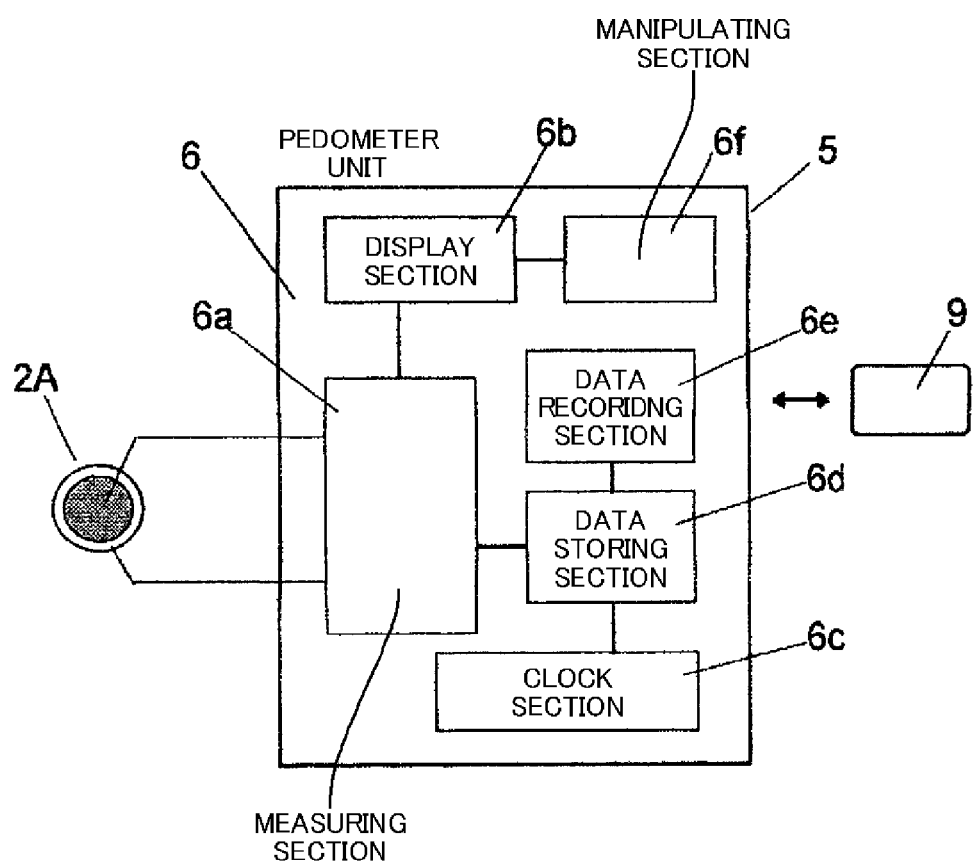
FIG. 13A is a partial block diagram illustrating one exemplary embodiment of the present invention.

Referring to FIGS. 1A to 1D, an electromotive unit 2 is shaped like a flat plate to have a substantially circular outline. A wire material 3 is connected to the electromotive unit 2 and configured to deliver the electric current produced by the electromotive unit 2. The wire material 3 is formed by a two-core parallel cable having a length of approximately 10 cm and configured to deliver the electric current from the inside of a shoe to the outside of the shoe. The wire material 3 is fixed onto a desired position in the shoe by a fastener 4, which is realized by a clip 4a. On the end of the clip 4a, a housing 5 including therein a pedometer unit 6 shown in FIG. 13A is integrally provided. Inside the clip 4a, a groove 4d is formed, into which the wire material 3 is fitted. The free end of the wire material 3 is inserted into the housing 5 and connected to the pedometer unit 6. Referring to the fastener 4, the clip 4a is formed by an appropriately flexible resin material or the like and into U-shaped, so that the clip 4a can be fixed by clipping a desired edge of the shoe.

Figure 1A:
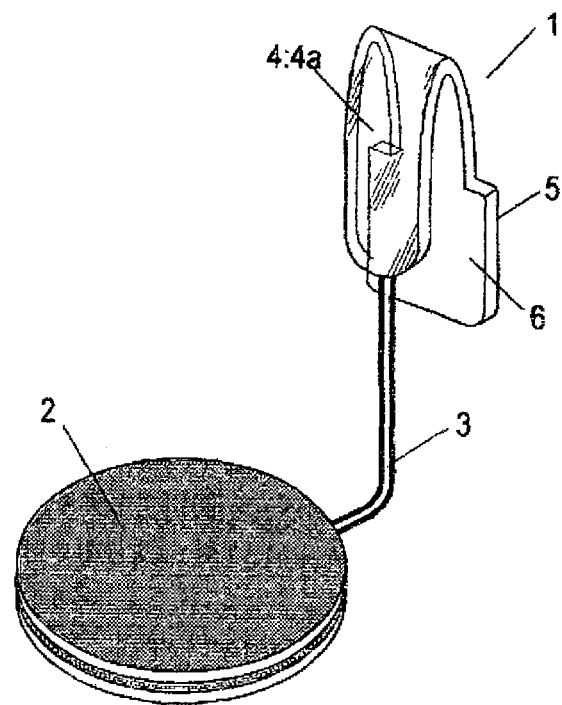
FIG. 1A is a perspective view illustrating one exemplary embodiment of the present invention.
Figure 1B:
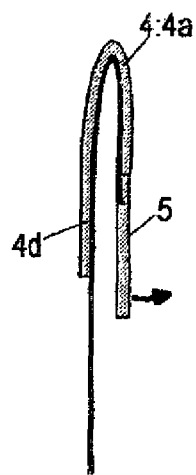
FIG. 1B is a partial vertical cross-sectional view illustrating one exemplary embodiment of the present invention.
Figure 1C:
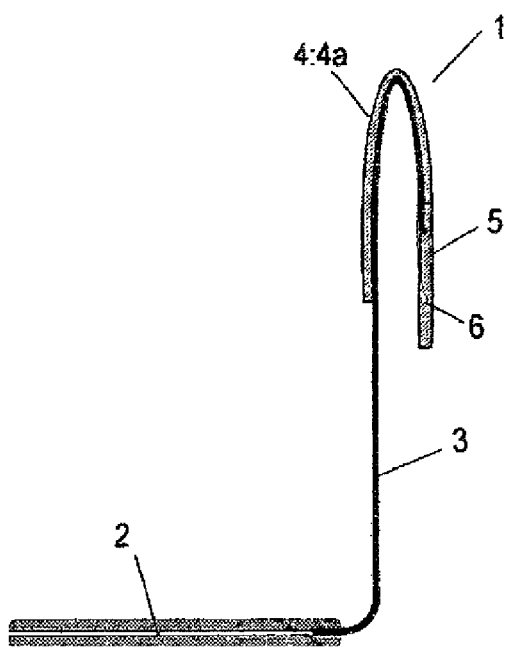
FIG. 1C is a vertical cross-sectional view illustrating one exemplary embodiment of the present invention.
Figure 1D:
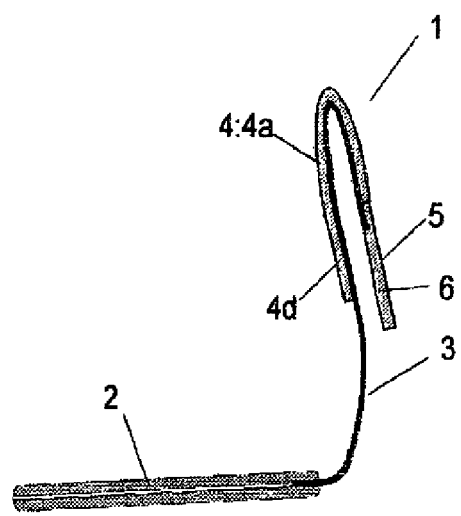
FIG. 1D is a vertical cross-sectional view illustrating one exemplary embodiment of the present invention.

FIG. 1B illustrates that the clip 4a is in a normal state without a load being placed on the clip 4a. Due to its flexibility, when the clip 4a is bent in the direction indicated by the arrow to reach the state shown in FIG. 1C, the clip 4a is always applied with a force to move back inwards in order to return to its original state shown in FIG. 1B. Therefore, when the clip 4a clips the edge of the opening of the shoe, the clip 4a can be fixed while clipping the edge due to its flexibility. While the clip 4a and the housing 5 are integrally formed in the present exemplary embodiment, the clip 4a and the housing 5 may be separately formed.

Figure 4A:
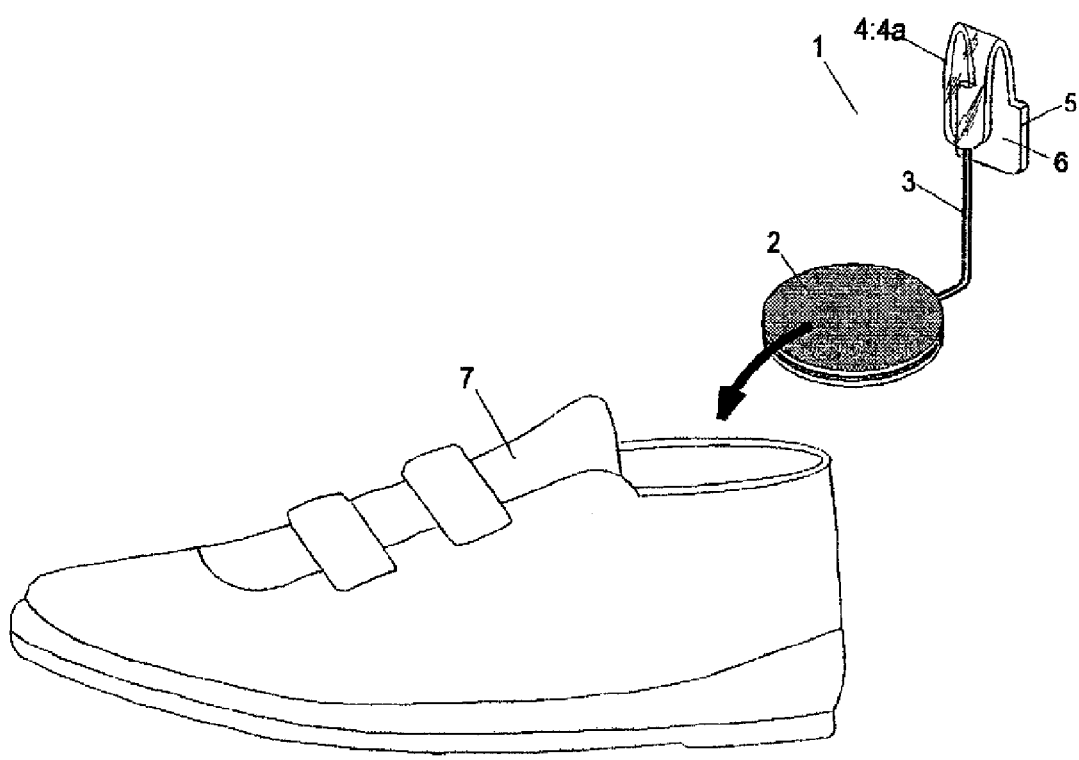
FIG. 4A includes a side view and a perspective view illustrating one exemplary embodiment of the present invention.
Figure 4B:
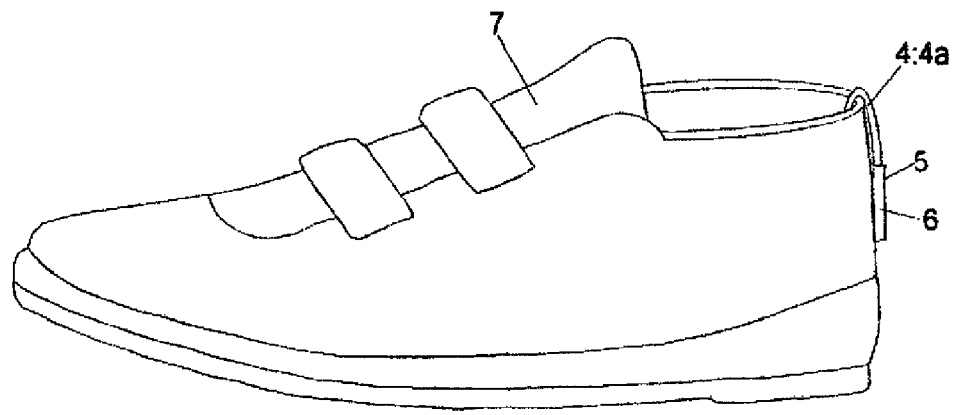
FIG. 4B is a partial side view illustrating how the present invention is implemented.
Figure 4C:
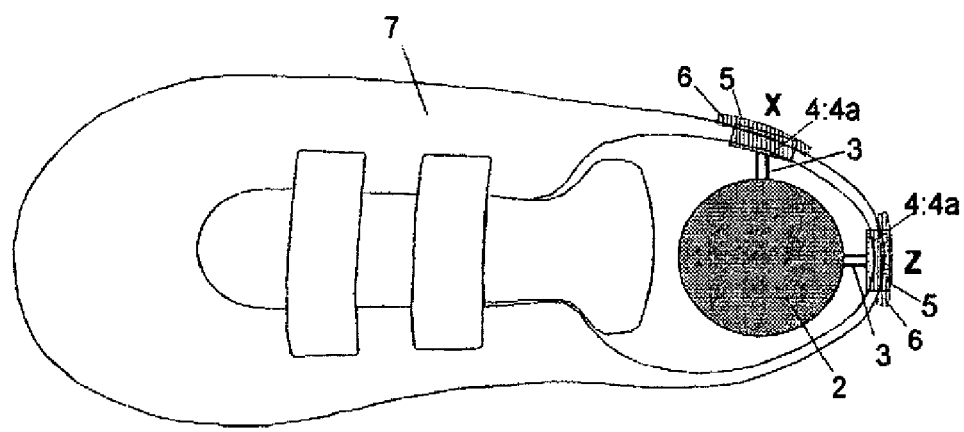
FIG. 4C is a plan view illustrating how the present invention is implemented.

FIGS. 4A to 4C illustrate how the exemplary embodiment of the pedometer for a shoe according to the present invention shown in FIGS. 1A to 1D is mounted on a ready-made shoe in such a manner that the clip 4a of the fastener 4 clips the shoe. As shown in FIGS. 4A to 4C, the clip 4a clips the edge of the opening of the shoe, so that the above-described flexibility of the clip 4a enables the pedometer to be securely fixed. The pedometer can be fixed as shown in FIG. 4B.

Figure 5A:
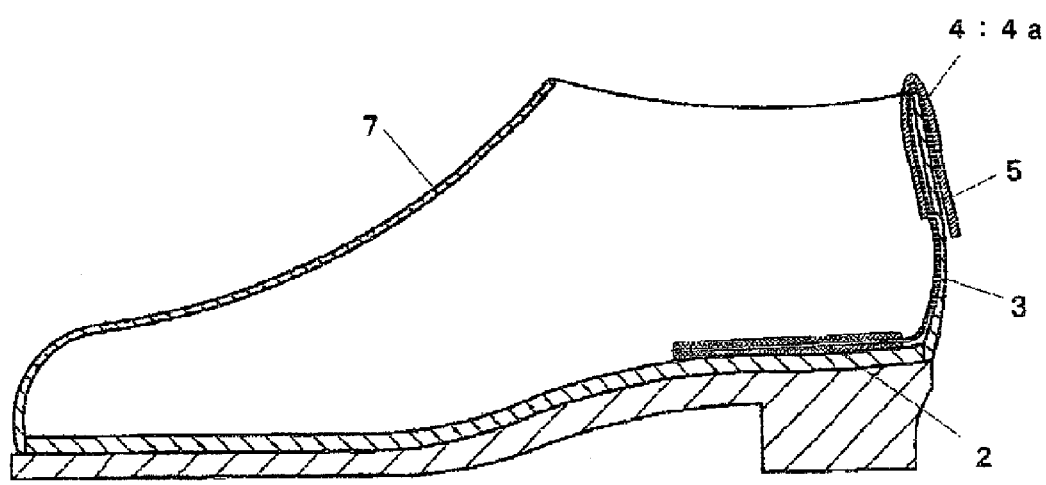
FIG. 5A is a vertical cross-sectional view illustrating one exemplary embodiment of the present invention.
Figure 5B:
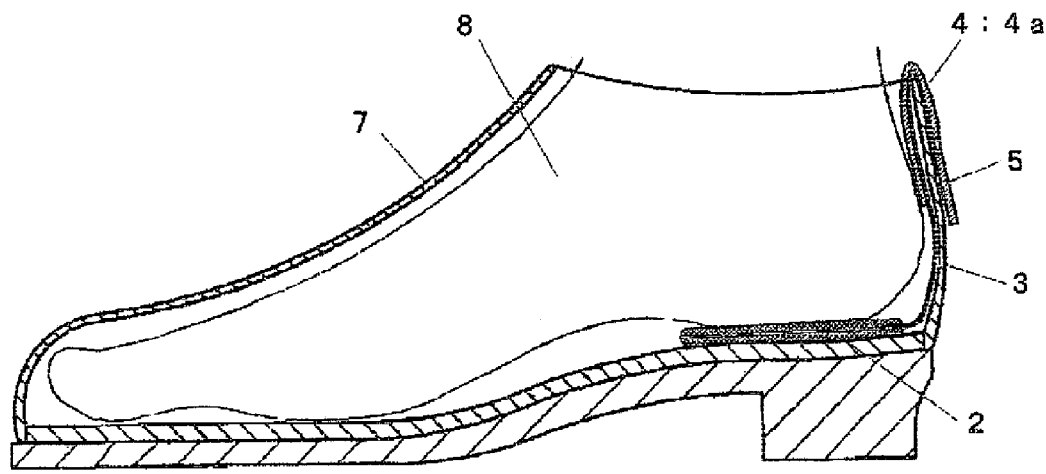
FIG. 5B is a vertical cross-sectional view illustrating one exemplary embodiment of the present invention.

FIGS. 5A and 5B are vertical cross-sectional views illustrating how the exemplary embodiment of the pedometer for a shoe according to the present invention shown in FIGS. 1A to 1D is mounted on a shoe. As shown in FIG. 5A, the electromotive unit 2 and a pressure detector 13, described later, which constitute the pedometer for a shoe according to the present invention, are shaped as flat plates. Being flat and thin, the electromotive unit 2 and the pressure detector 13 can be placed and mounted on the shoe sole in a small space within the shoe, and, when a user wears the shoe and walks, do not make the user to feel uncomfortable and obstructive. Referring to the state shown in FIG. 5B where the user wears the shoe, as the user walks or runs with his/her heel being placed on the electromotive unit 2, a loading of the user's body weight is applied onto the flat-plate-like electromotive unit 2. The loading exerts a pressure on the piezoelectric element 2b of the piezoelectric electromotive unit 2A constituting the electromotive unit 2 and deforms and distorts the piezoelectric element 2b. The distortion and deformation causes the piezoelectric element 2b to produce an electric current. How the electric current is produced is described later with reference to FIGS. 7A to 7C. In the exemplary embodiment shown in FIGS. 1A to 1D, the clip 4a may be made of a metal plate such as an aluminum plate or a resin material.

The following describes how the pedometer for a shoe according to the present invention is mounted. As shown in FIG. 4C, the clips 4a clip desired portions of the edge of the opening of the shoe at the side (X) and at the back (Z) to fix the pedometer. Therefore, depending on the positions at which the clips 4a are fixed, the user can confirm the number of steps counted at the side (the X direction) or at the back (the Z direction). In the exemplary embodiment shown in FIG. 4C, the electromotive unit 2 is affixed and fixed onto the bottom surface of the shoe, and the wire material 3 is formed longer than necessary. In this way, as shown in FIG. 5B, the extra portion of the wire material 3 can be arranged along the shoe in an empty space in the back end region within the shoe behind the user's heel, so that the fastener 4 can be fixed and mounted at a desired position. According to such a configuration, the connection between the wire material 3 and the electromotive unit 2 and the wire are positioned in an empty space within the shoe. Therefore, even if various movements of the user's foot in the shoe may exert a pressure, the connection of the wire material 3 is not applied with tension, and the wire material 3 does not break or suffer from poor connection in the shoe. When the pedometer is fixed by means of the fastener 4, in particular, when the clip 4a clips a desired portion of the shoe to fix the pedometer onto the shoe, the pedometer may be fixed and mounted on a shoelace, an instep cover in addition to the edge of the opening of the shoe. Furthermore, the empty space in the shoe may not be limited to the back end region in the shoe behind the user's heel, but an empty space at the front or at the side in the shoe.

Figure 2A:
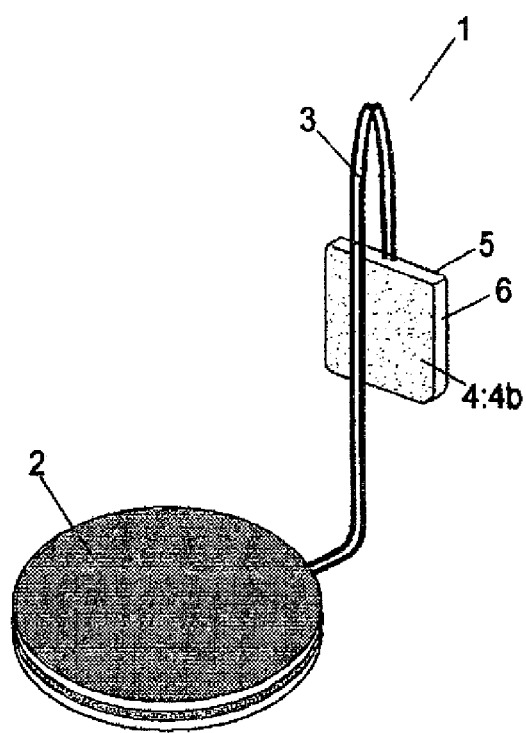
FIG. 2A is a perspective view illustrating one exemplary embodiment of the present invention.
Figure 2B:
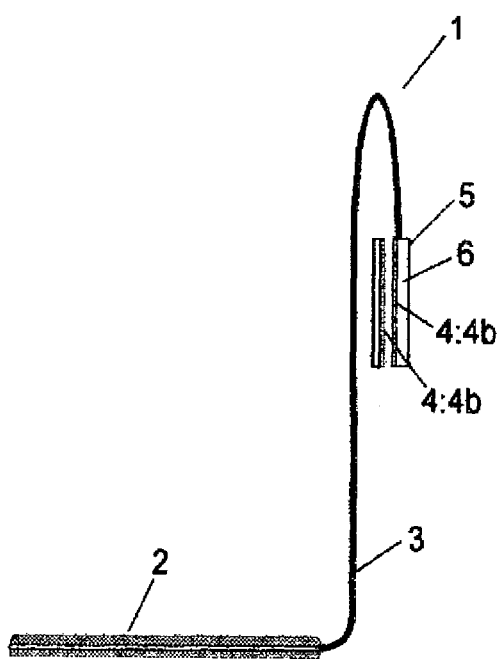
FIG. 2B is a side view illustrating one exemplary embodiment of the present invention.
Figure 6:
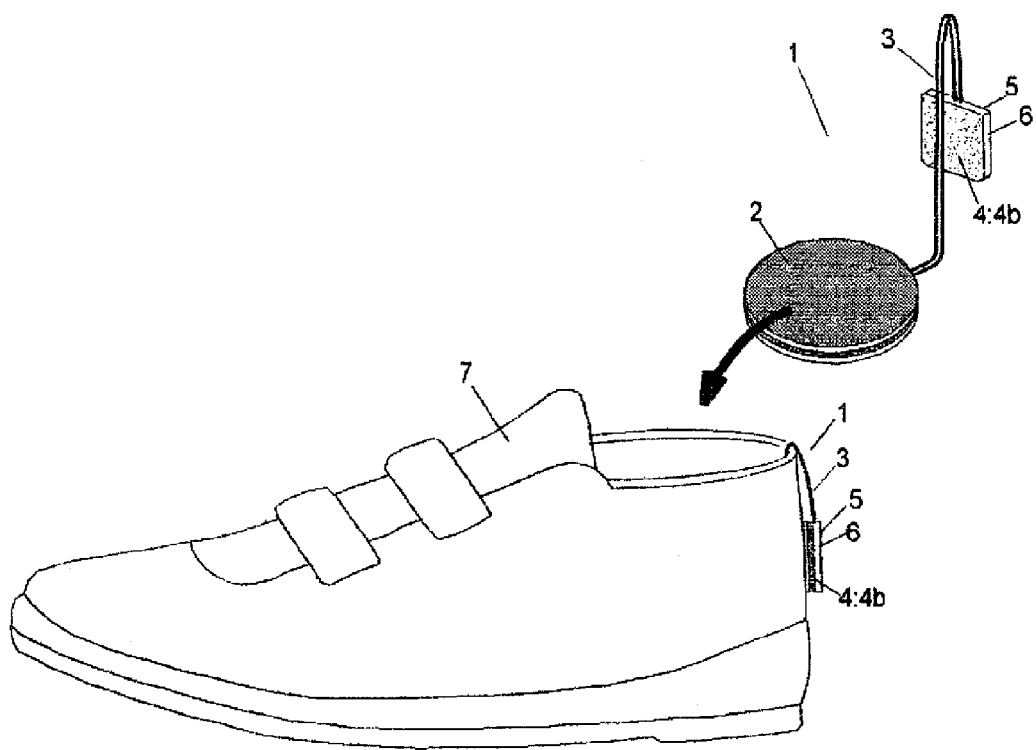
FIG. 6 includes a partial side view and a perspective view illustrating how the present invention is implemented.

FIGS. 2A to 2D illustrate another exemplary embodiment of the fastener 4 of the pedometer for a shoe according to the present invention. In the exemplary embodiment shown in FIGS. 2A and 2B, the fastener 4 is constituted by an engaging element 4b. The engaging element 4b is provided on the back surface of the housing 5 having therein the pedometer unit 6. The engaging element 4b may have an adhesive applied thereonto, for example, and be affixed onto a desired portion on the shoe by peeling off release paper covering the adhesive. Alternatively, as shown in FIG. 2B, engaging elements 4b that are configured to engage with each other are provided. In this case, as shown in FIG. 6, one of the engaging elements 4b having an appropriate size may be affixed onto a desired portion on the shoe, and the other engaging element 4b may be positioned to engage the affixed engaging element 4b. According to this exemplary embodiment, the position at which the engaging elements 4b engage with each other can be varied to some extent by utilizing the size of one of the engaging elements 4b, and the position of the housing 5 can be appropriately varied when the housing 5 is fixed. The engaging elements 4b that are configured to engage with each other can be realized by, for example, hook-and-loop fasteners, magnets, or a pair of a magnet and a steel plate.

Figure 2C:
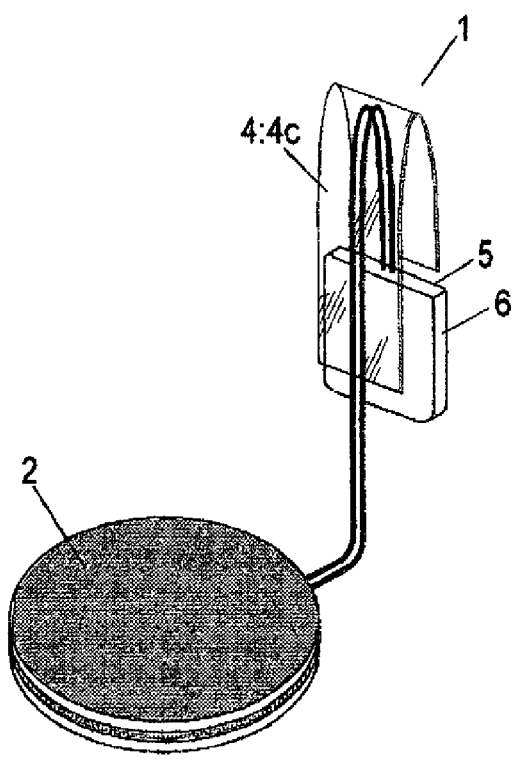
FIG. 2C is a perspective view illustrating one exemplary embodiment of the present invention.
Figure 2D:
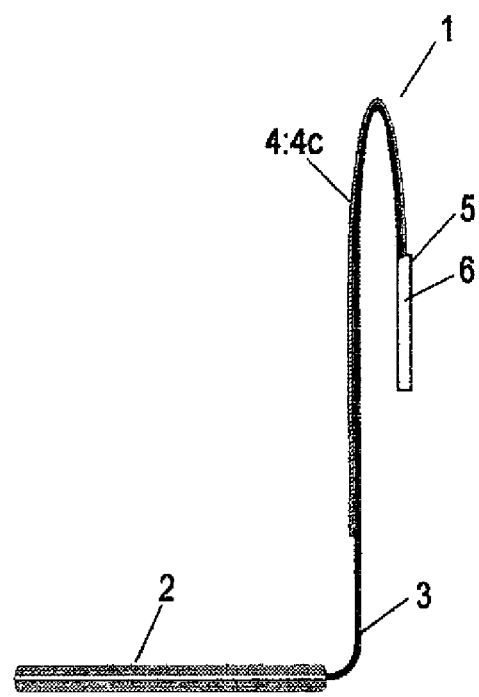
FIG. 2D is a side view illustrating one exemplary embodiment of the present invention.

According to the exemplary embodiment shown in FIGS. 2C and 2D, the fastener 4 is constituted by a tape material 4c. The tape material 4c is sized such that the length is 8 cm and the width is approximately 2 cm. The tape material 4c covers the wire material 3 and fixes the pedometer onto the shoe by affixing the wire material 3 onto the shoe from the inside to the outside of the shoe over the edge. This way of fixing can achieve tight fixation without allowing a play portion of the wire material 3. For example, the tape material 4c can be affixed onto the edge of the shoe by peeling of release paper from the tape material 4c to fix the pedometer onto the shoe. The tape material 4c can be constituted by, for example, a vinyl tape, a fabric adhesive tape, an aluminum foil tape or the like. As another exemplary embodiment, the fastener 4 may be constituted by an adhesive that is applied in advance onto the surface of the wire material 3.

Figure 8A:
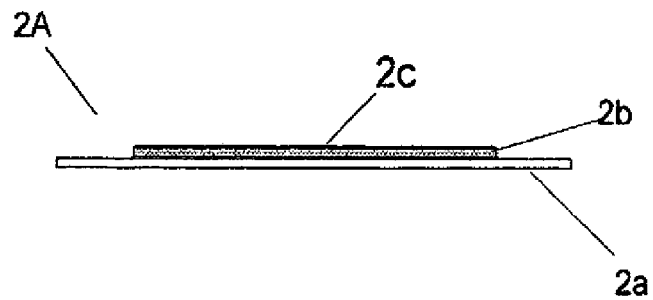
FIG. 8A is a partial side view illustrating one exemplary embodiment of the present invention.
Figure 8B:
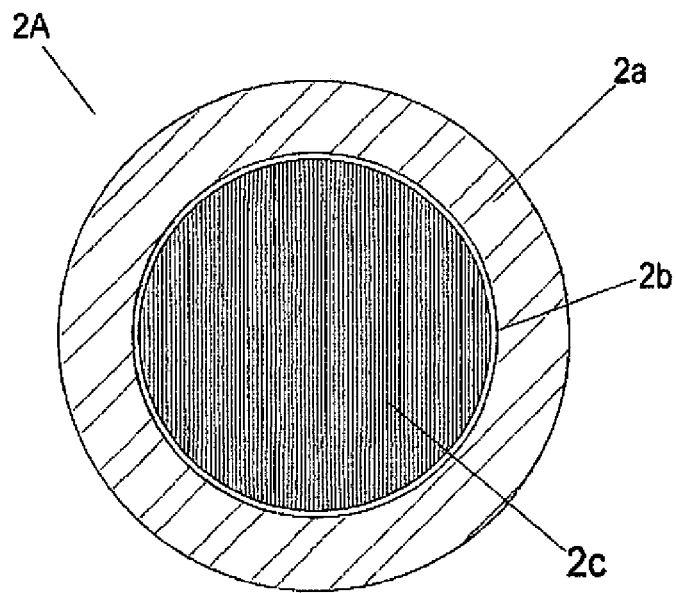
FIG. 8B is a partial plan view illustrating one exemplary embodiment of the present invention.

FIGS. 3A to 3D illustrate exemplary embodiments of the electromotive unit 2 of the pedometer for a shoe according to the present invention. The electromotive unit 2 constituting the pedometer for a shoe is configured to produce an electric current, shaped like a flat plate, and formed by a piezoelectric electromotive unit 2A. The piezoelectric electromotive unit 2A can be embodied as shown in FIGS. 8A and 8B. The following describes in detail the configuration of the piezoelectric electromotive unit 2A. According to the present invention, the piezoelectric electromotive unit 2A shown in FIGS. 8A and 8B is made of piezoelectric ceramic, and is constituted by a flat-plate-like substrate 2a that has an appropriate thickness, is flexible and is preferably a metal plate. The piezoelectric electromotive unit 2A further includes a flat and thin piezoelectric element 2b positioned on the surface of the substrate 2a and an electrode surface 2c positioned on the upper surface of the piezoelectric element 2b. The piezoelectric element 2b has appropriate size and thickness. Generally speaking, a piezoelectric element made of piezoelectric ceramic has no elasticity and breaks when exposed to strong impact and bending force. When a piezoelectric element made of piezoelectric ceramic is formed flat and thin, however, such a piezoelectric element acquires some elasticity and can be bent to some extent without breaking. Therefore, when the flat and thin piezoelectric element 2b made of piezoelectric ceramic is provided on the flat-plate-like and flexible substrate 2a made from a metal plate as shown in FIGS. 8A and 8B, the piezoelectric element 2b can produce an electric current by being bent without breaking.

As discussed above, by being formed by the flexible substrate 2a and the flat and thin piezoelectric element 2b arranged on the surface of the substrate 2a, the piezoelectric electromotive unit 2A constituting the present invention can be arranged on the shoe sole within the shoe without uncomfortable feeling since the piezoelectric element 2b can be appropriately bent without breaking, does not occupy much space due to being thin and flat, can be appropriately bent in proportion to the force exerted by pressure or impact applied from above, and can serve as a cushion to absorb the force and mitigate the damage that may be caused by the force. The flexible substrate 2a constituting the piezoelectric electromotive unit 2A can produce the following three effects. Firstly, since the substrate 2a is slightly bend and deformed due to its flexibility, the thin and flat piezoelectric element 2b made of piezoelectric ceramic arranged on the substrate 2a can be conformally bent and deformed, so that the piezoelectric element can be bent and deformed without breaking to produce an electric current. Secondly, the flexible substrate 2a can serve as a cushion to absorb force applied from above and to mitigate impact. Thirdly, after the thin and flat piezoelectric element 2b arranged on the flexible substrate 2a is bent inward and produces an electric current, as discussed later with reference to FIGS. 7A to 7C, which explain how an electric current is produced, the flexible substrate 2a is deformed to regain by itself its original shape due to its flexible property and this deformation to regain its original shape can also produce an electric current.

In an exemplary embodiment of the present invention, the substrate 2a constituting the piezoelectric electromotive unit 2A can be formed by a flexible metal or the like into an appropriate thickness and, for example, made of brass, aluminum, copper, alloy 42, and the like. Alternatively, the substrate 2a may be formed by evaporating aluminum or by depositing electrically conductive carbon or the like on the surface of a thin plastic material. Alternatively, the substrate 2a may also be entirely formed by an electrically conductive rubber or an electrically conductive plastic material. The thickness of the substrate 2a may be selected such that the substrate 2a is appropriately bent and has flexibility. In an exemplary embodiment where the substrate 2a is formed by a metal plate, the substrate 2a may have a thickness of, for example, 1 mm to 2 mm or less, or 0.3 mm to 0.5 mm or less, further preferably 0.2 mm or less, depending on the properties of the metal used. The piezoelectric ceramic used to form the piezoelectric element 2b can be obtained by sintering and performing polarization treatment on barium titanate ($BaTiO_3$), lead titanate, lead niobate, lithium niobate and the like, in addition to lead zirconium titanate (PZT). In an exemplary embodiment, the piezoelectric element 2b can be formed to have a thickness of 0.06 mm to 0.2 mm.

Figure 8C:
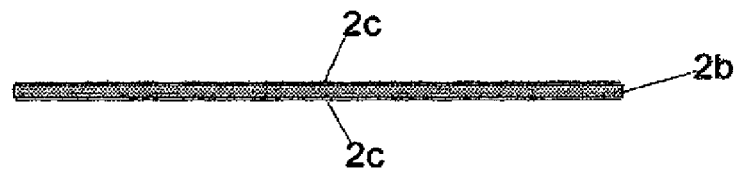
FIG. 8C is a partial side view illustrating one exemplary embodiment of the present invention.
Figure 8D:
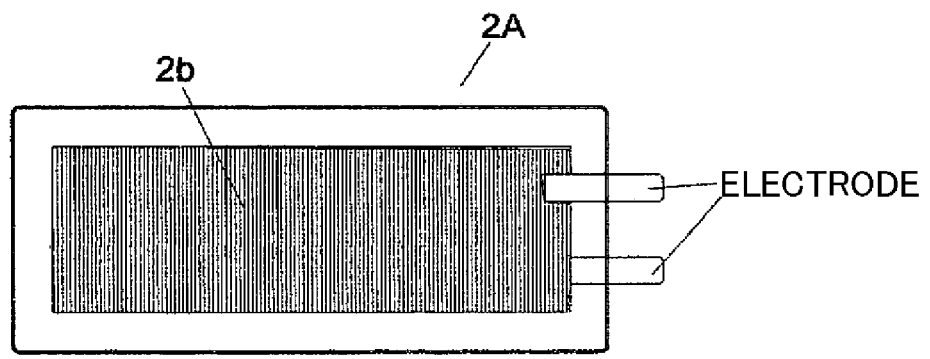
FIG. 8D is a partial plan view illustrating one exemplary embodiment of the present invention.
Figure 9A:
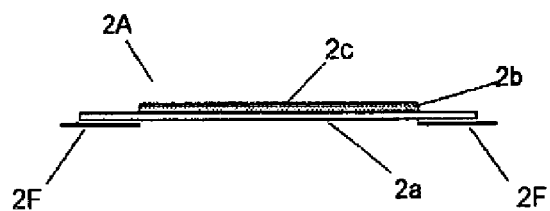
FIG. 9A is a partial side view illustrating one exemplary embodiment of the present invention.
Figure 9B:
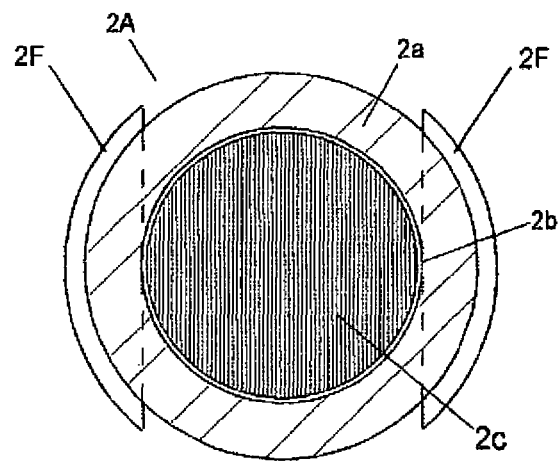
FIG. 9B is a partial plan view illustrating one exemplary embodiment of the present invention.
Figure 9C:
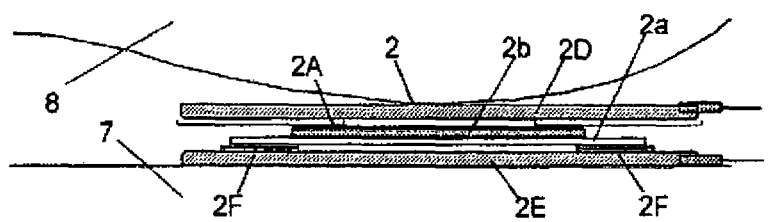
FIG. 9C is a partial vertical cross-sectional view illustrating one exemplary embodiment of the present invention.
Figure 9D:
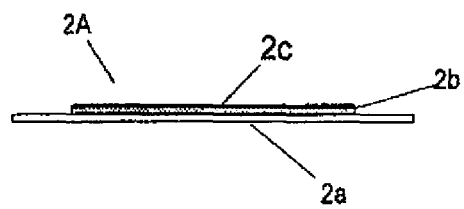
FIG. 9D is a partial side view illustrating one exemplary embodiment of the present invention.
Figure 9E:
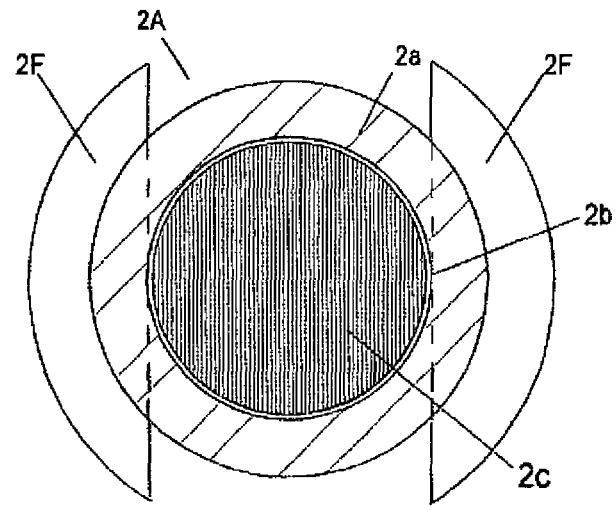
FIG. 9E is a partial plan view illustrating one exemplary embodiment of the present invention.
Figure 9F:
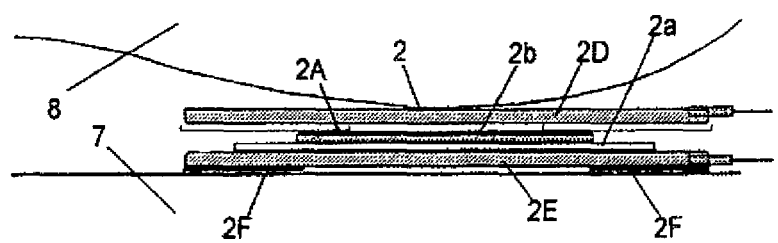
FIG. 9F is a partial vertical cross-sectional view illustrating one exemplary embodiment of the present invention.

The piezoelectric element 2b shown in FIGS. 8A and 8B may be formed by a piezoelectric film, which may be a polyvinylidene fluoride (PVDF) film or the like. Any material for the piezoelectric element 2b generates electric polarization therein to produce an electric current when applied with a pressure. When a piezoelectric film is used to embody the piezoelectric element 2b, the piezoelectric element 2b is formed by a piezoelectric film alone and electrode surfaces 2c may be formed on the respective sides of the piezoelectric film as shown in FIG. 8C. Alternatively, without the electrode surfaces 2c on the piezoelectric film, the electrically conductive substrate 2a may be directly provided on the piezoelectric film. Alternatively, as shown in FIG. 8D, the piezoelectric electromotive unit 2A may be formed by encapsulating the entire piezoelectric film with a resin. In this case, the produced electric power may be output from an electrode protruding from the end of the piezoelectric electromotive unit 2A.

Figure 3A:
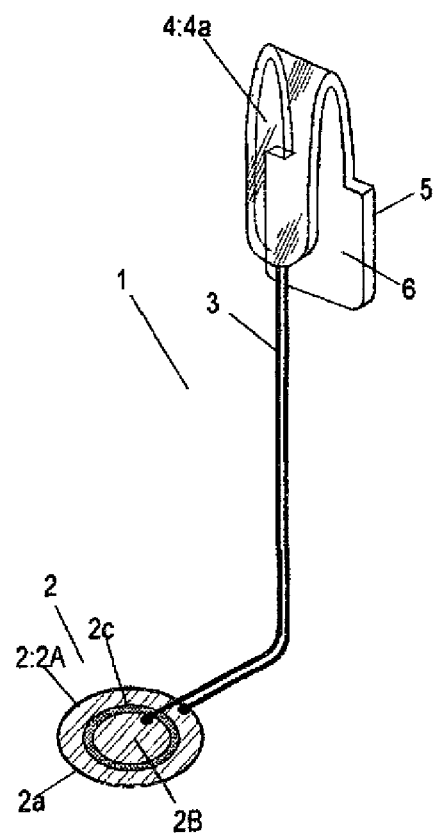
FIG. 3A is a partial exploded perspective view illustrating one exemplary embodiment of the present invention.
Figure 3B:
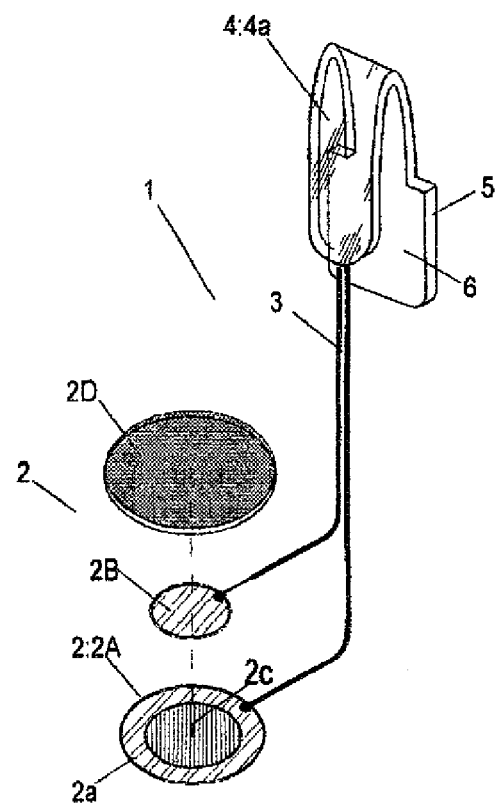
FIG. 3B is a partial exploded perspective view illustrating one exemplary embodiment of the present invention.

FIGS. 3A to 3D illustrate exemplary embodiments of the electromotive unit 2 constituting the pedometer for a shoe according to the present invention. FIG. 3A illustrates an exemplary embodiment where the electromotive unit 2 is formed merely by the piezoelectric electromotive unit 2A. The piezoelectric electromotive unit 2A is configured as described above. The core lines externally exposed at the end of the wire material 3 are connected using soldering or other techniques respectively to the surface of the substrate 2a and to the surface of the flexible electrode plate 2B. Then, the core-line-connected surface of the electrode plate 2B is brought into contact with the electrode surface 2c of the piezoelectric element 2b. With the configuration shown in FIG. 3A, even when the electromotive unit 2 is placed on the bottom surface (on the shoe sole) of the shoe as shown in FIGS. 5A and 5B, the substrate 2a and the electrode plate 2B absorb the loading applied from the user's heel and are deformed and appropriately bent due to their flexibility with the help of the slight elasticity of the shoe sole. Conformally with the bending and deformation, the piezoelectric element 2b is also appropriately bent and distorted to produce an electric current. In this way, the present invention can be embodied. Instead of connecting one of the core lines of the wire material 3 to the electrode plate 2B using soldering or other techniques, one of the core lines of the wire material 3 may be directly connected to the electrode surface 2c of the piezoelectric element 2b using soldering or other techniques. This configuration is also possible. Alternatively, the wire material 3 may be connected to the electrode surface 2c of the piezoelectric film shown in FIG. 8C or to the electrode shown in FIG. 8D. FIG. 3B illustrates an exemplary embodiment where an elastic overlay 2D is additionally layered on the exemplary embodiment shown in FIG. 3A. According to this configuration, the elastic overlay 2D can additionally absorb the loading applied from the user's heel. Therefore, the user does not feel discomfort while wearing a shoe with the electromotive unit 2 according to the present invention being placed within the shoe.

Figure 3C:
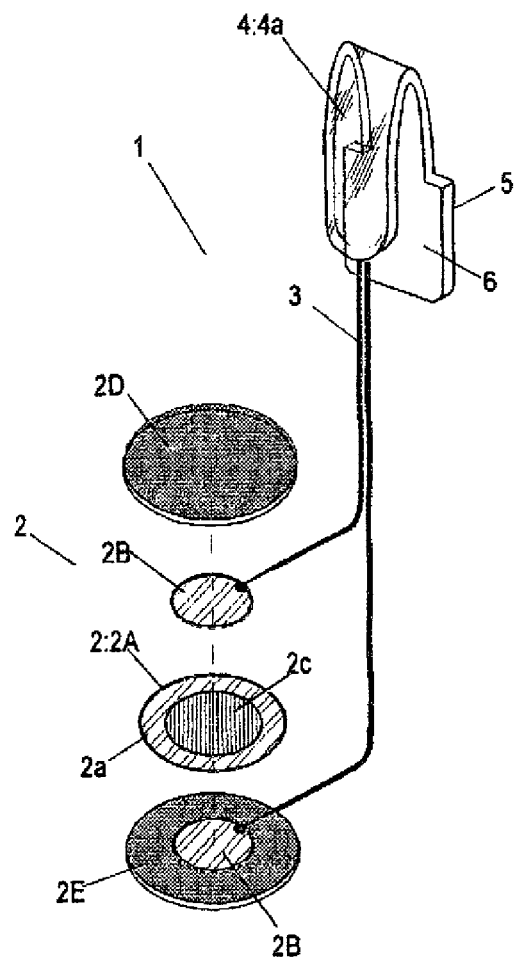
FIG. 3C is a partial exploded perspective view illustrating one exemplary embodiment of the present invention.

FIG. 3C illustrates an exemplary embodiment where an elastic underlay 2E is additionally layered under the exemplary embodiment shown in FIG. 3B and one of the core lines of the wire material 3 is connected using soldering or other techniques onto an electrode plate 2B on the underlay 2E. According to the configuration, the elastic overlay 2D and underlay 2E can additionally absorb the loading applied from the user's heel. Therefore, the user does not feel uncomfortable at all while wearing the shoe and even feels comfortable.

Figure 3D:
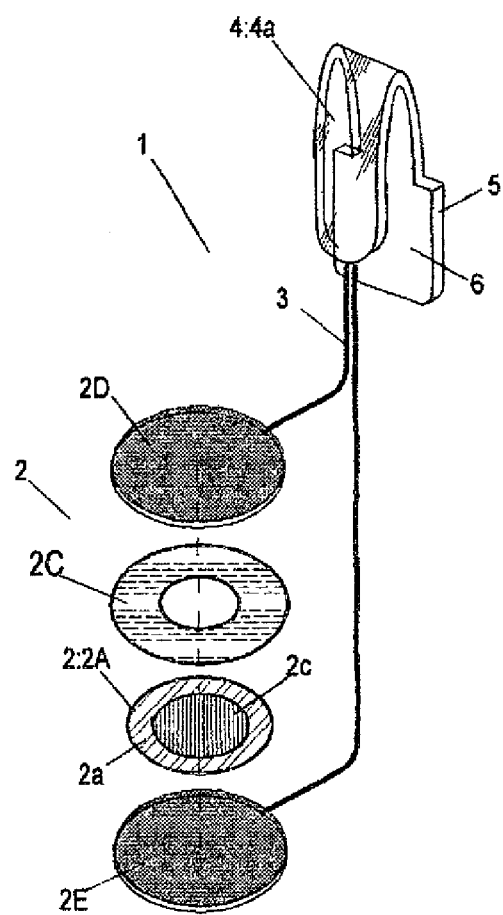
FIG. 3D is a partial exploded perspective view illustrating one exemplary embodiment of the present invention.

The elastic overlay 2D and underlay 2E can be made of a rubber material, plastic foam and the like, and have a thickness of, for example, approximately 0.5 mm to 2 mm. In the exemplary embodiment shown in FIG. 3B, the overlay 2D may be replaced with the underlay 2E and only the underlay 2E may be provided under the substrate 2a. FIG. 3D is an exemplary embodiment where the overlay 2D and underlay 2E are made of electrically conductive rubber. Since the electrically conductive rubber is elastic and also electrically conductive, connecting the core lines of the wire material 3 to the overlay 2D and the underlay 2E made of the electrically conductive rubber and placing the overlay 2D and the underlay 2E to sandwich the piezoelectric electromotive unit 2A therebetween bring the upper surface of the underlay 2E into contact with the lower surface of the substrate 2a and achieves electrical conduction between the surfaces, and similarly bring the lower surface of the overlay 2D into contact with the electrode surface 2c of the piezoelectric element 2b and achieves electrical conduction between the surfaces. In this way, the piezoelectric electromotive unit 2A can be directly supplied with electric power from the overlay 2D and underlay 2E and the step of performing soldering or other techniques can be thus omitted. This substantially simplifies the manufacturing process. When this configuration is employed, to insulate the overlay 2D and the underlay 2E from each other, a toroidal insulating material 2C, which is made of paper or the like and is slightly larger than the overlay 2D and the underlay 2E, is interposed as shown in FIG. 3D. The insulating material 2C only allows the lower surface of the overlay 2D and the electrode surface 2c to be in contact with each other and establish electrical conduction through the opening positioned in the center of the insulating material 2C.

Figure 11A:
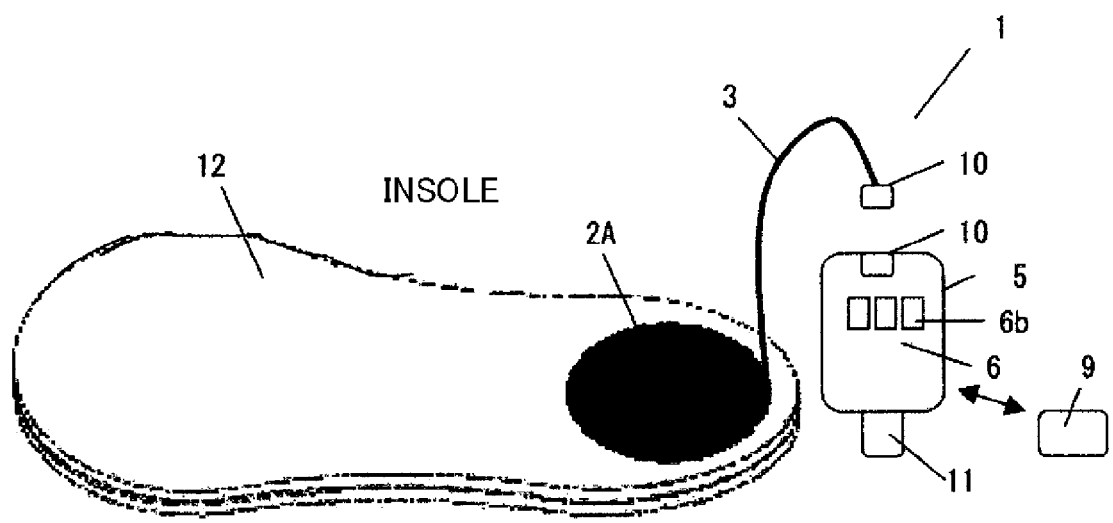
FIG. 11A is a perspective view illustrating one exemplary embodiment of the present invention.
Figure 11B:
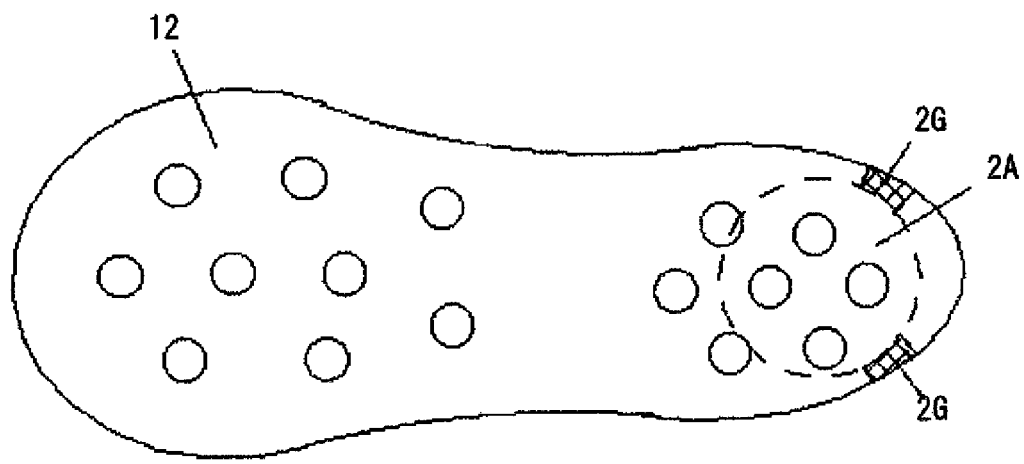
FIG. 11B is a partial plan view illustrating one exemplary embodiment of the present invention.
Figure 11C:
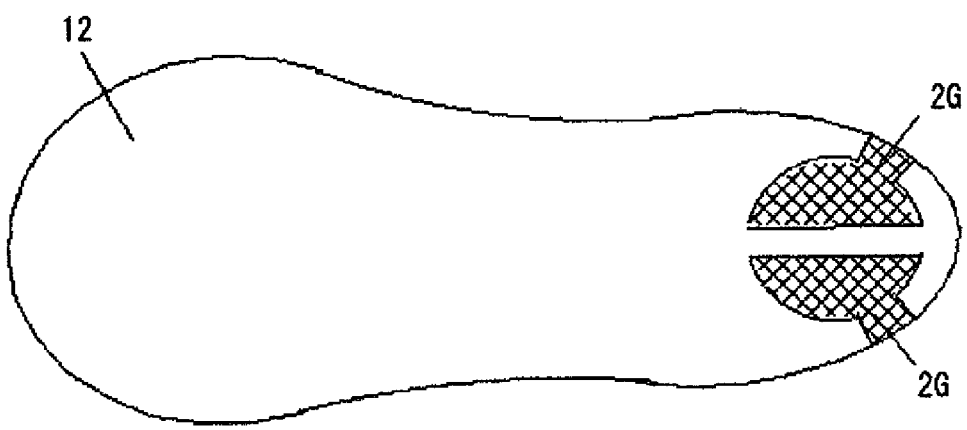
FIG. 11C is a partial plan view illustrating one exemplary embodiment of the present invention.

The respective exemplary embodiments of the electromotive unit 2 may be modified in such a manner that the constituents of the piezoelectric electromotive unit 2A are arranged upside down. Specifically speaking, the substrate 2a may be arranged on the piezoelectric element 2b and the electrode surface 2c. Thus, the constituents of the electromotive unit 2 shown in FIGS. 3A to 3D may be arranged in a reversed order from top to down. The outline of the electromotive unit 2 constituting the present invention may not be limited to substantially circular as shown in the exemplary embodiments, but may be polygonal. Furthermore, the electromotive unit 2 may be formed in an insole as shown in FIGS. 11A to 11C. The position of the electromotive unit 2, which is designed to be placed within a shoe, may not be limited to the position that comes into contact with the user's heel, but be a position that comes into contact with the user's foot between the arch and the toes. Since the present invention can be also mounted on a sandal or slipper, the pedometer for a shoe according to the present invention is applicable to a sandal, a slipper and the like.

Figure 7A:
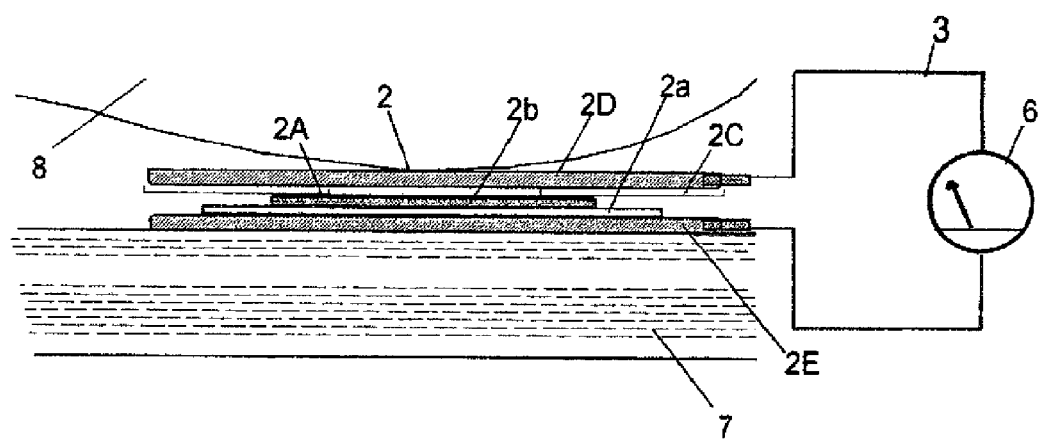
FIG. 7A includes a partial vertical cross-sectional view and a partial circuit diagram illustrating one exemplary embodiment of the present invention.
Figure 7B:
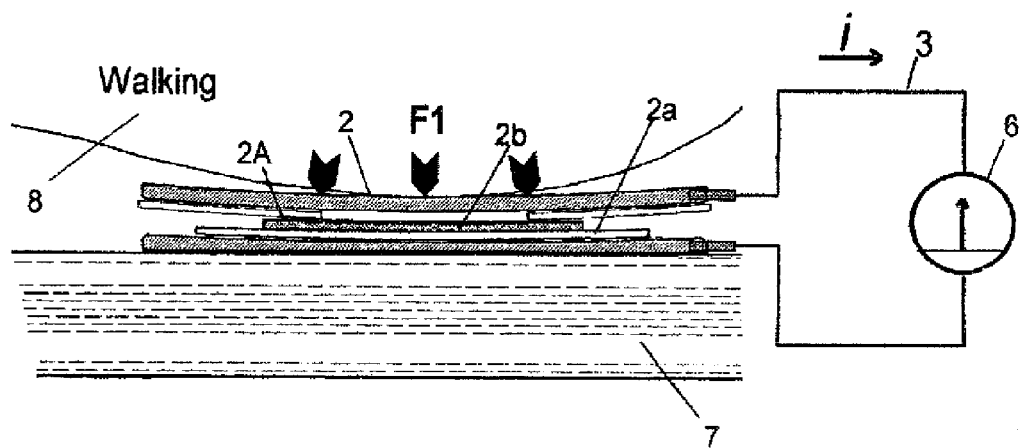
FIG. 7B includes a partial vertical cross-sectional view and a partial circuit diagram illustrating one exemplary embodiment of the present invention.
Figure 7C:
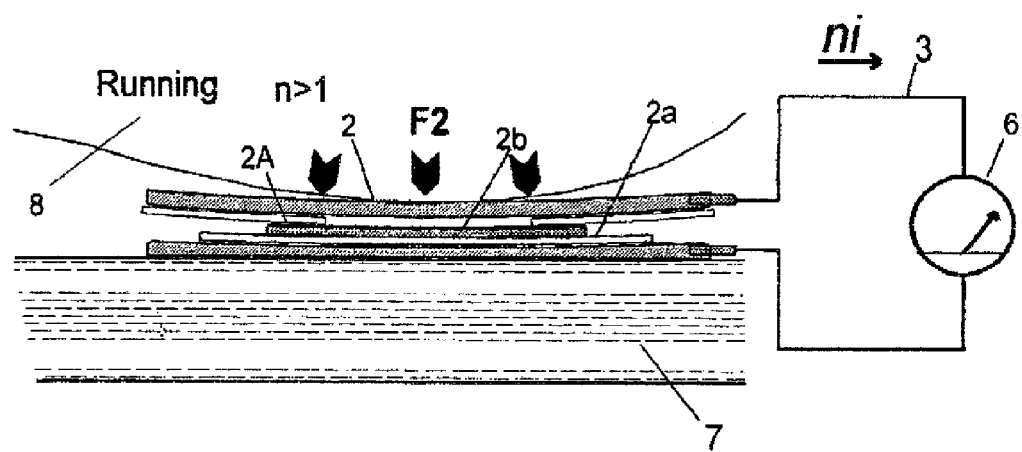
FIG. 7C includes a partial vertical cross-sectional view and a partial circuit diagram illustrating one exemplary embodiment of the present invention.
Figure 13B:
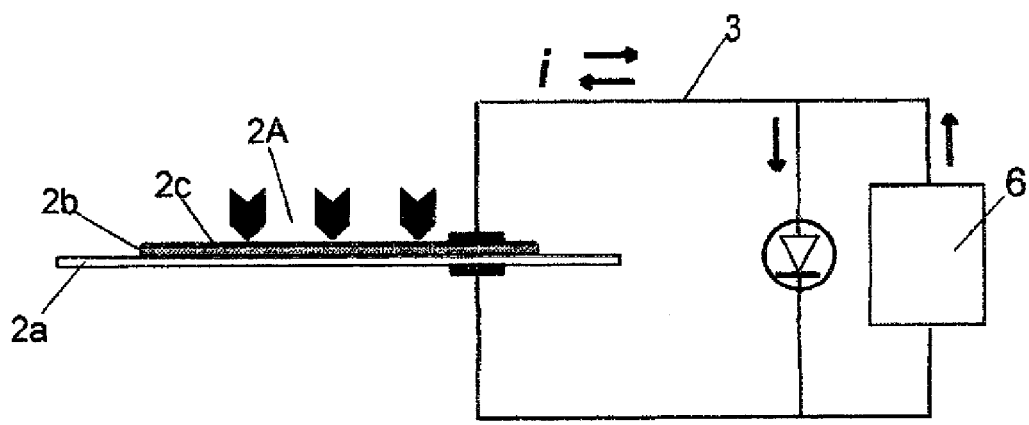
FIG. 13B includes a partial side view and a partial circuit diagram illustrating one exemplary embodiment of the present invention.

FIG. 13B and FIGS. 7A to 7C illustrate how an electric current is produced in relation to the present invention. FIG. 13B illustrates how an electric current is produced in the piezoelectric electromotive unit 2A, and FIGS. 7A to 7C illustrate how an electric current is produced by the electromotive unit 2 shown in FIG. 3D. In FIG. 13B, when the user walks and the user's foot lands the ground, a loading (pressure) is applied onto the piezoelectric element 2b provided on the substrate 2a as shown by the downward arrow. Accordingly, the piezoelectric element 2b is deformed and bent and simultaneously produces an electric current i (see the right-pointing arrow) in proportion to the loading (pressure). Once the pressure that has caused the deformation and bending is removed, the substrate 2a regains its original shape due to its flexibility. In conformal with this, the piezoelectric element 2b regains its original shape. Simultaneously, the piezoelectric element 2b produces a reverse electric current i (see the left-pointing arrow). According to this electric current production method, when the user wears the shoe and walks or runs as shown in FIG. 5B, the user's heel applies the user's weight (loading) onto the piezoelectric electromotive unit 2A every time the user's foot lands the ground. When applied with the weight (loading), the piezoelectric electromotive unit 2A is applied with the loading as indicated by the downward arrow. The substrate 2a and the piezoelectric element 2b are slightly bent outwards and thus deformed, which causes the piezoelectric element 2b to produce an electric current i (see the right-pointing arrow) as shown in FIG. 13B. The produced electric current is detected by the pedometer unit 6 shown in FIG. 13A, and counted and converted into the number of steps. In this way, the number of steps can be measured. In the exemplary embodiment shown in FIG. 13B, the reverse electric current i (shown by the left-pointing arrow) that is produced when the user's foot moves upwards is detected and measured.

Figure 17A:
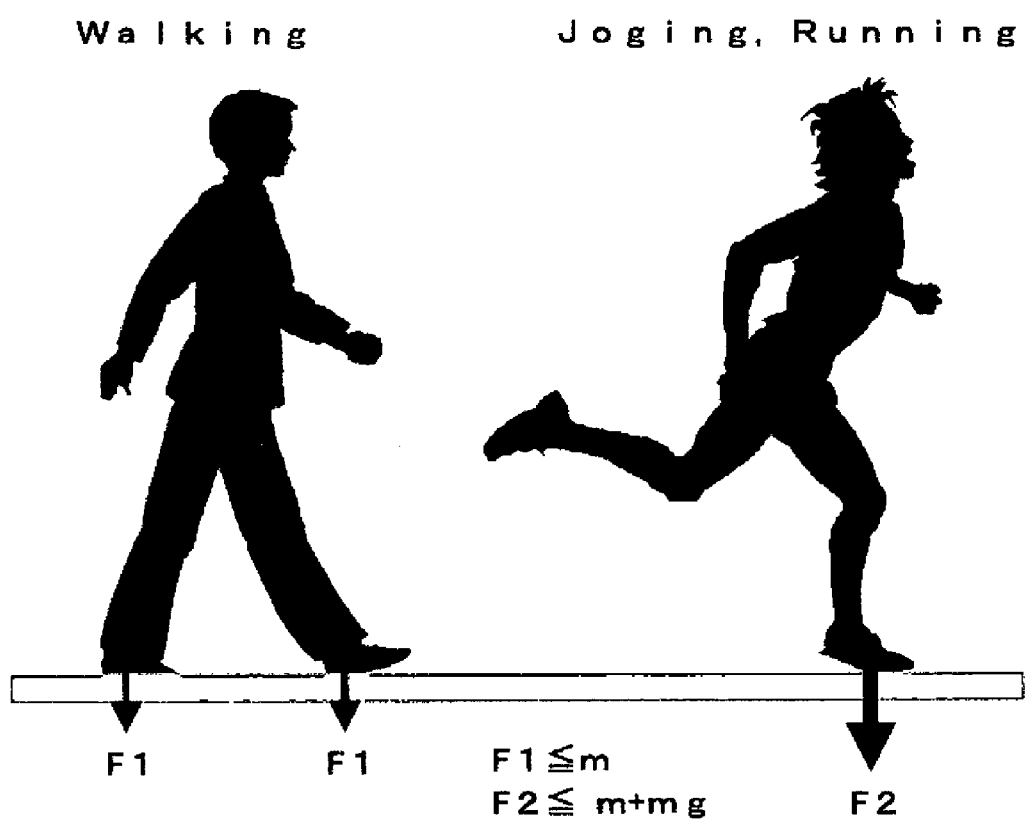
FIG. 17A is a side view illustrating the definitions of walking and running in the present invention.
Figure 17B:
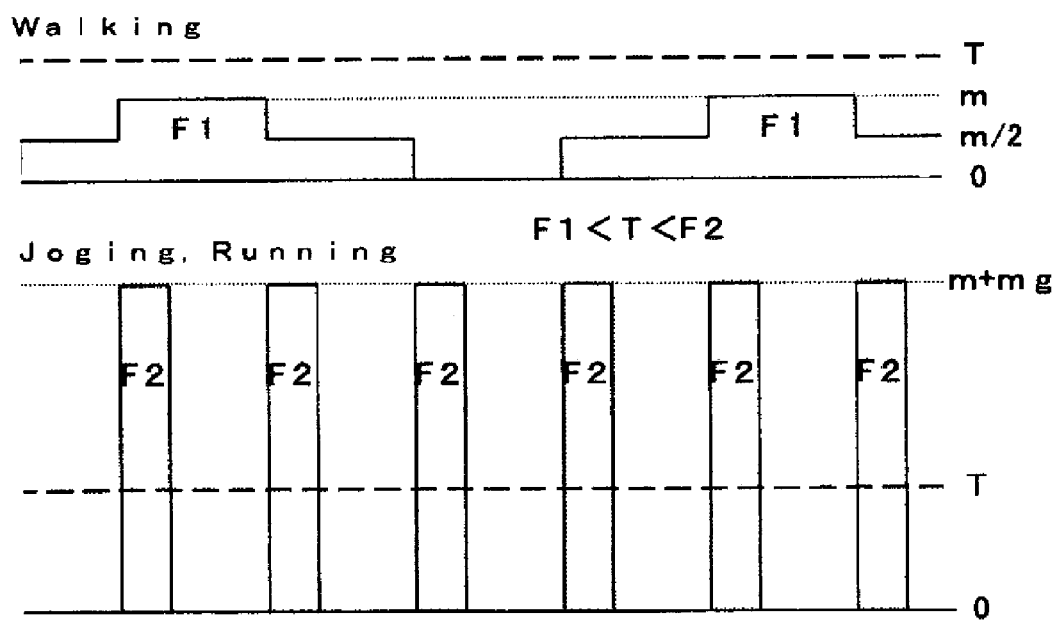
FIG. 17B is a time-sequence diagram illustrating variation of the loadings placed during walking and running according to the definitions of the present invention.

FIGS. 7A to 7C illustrate how the pedometer for a shoe according to the present invention separately detects and measures the number of walking steps and the number of running or jogging steps. To start with, FIGS. 17A and 17B specifically examine and compare the difference between walking and running. During walking, one of the user's feet moves up and then lands the ground. At this timing, both of the user's feet are always on the ground. When both of the user's feet are on the ground, one of the feet is applied with a loading (m/2) equal to approximately half the user's weight (m). Subsequently during walking, the other of the feet moves up. At this timing, the foot on the ground is applied with the entire weight (m). When the other foot subsequently lands the ground, both of the feet are on the ground again. At this timing, each of the feet is again applied with a loading of m/2. When one of the feet subsequently moves up, this foot is applied with no weight (loading). Thus, the loading is zero (m=0). In other words, the loading (F1) applied onto the bottom of one of the user's feet by the user's weight while the user walks repeatedly varies in the cycle of (m/2) to (m) to (m/2) to (0) to (m/2) to (m) to (m/2) to 0 as shown in FIG. 17B.

During running, on the other hand, after the user kicks off the ground with one of his/her feet, only the other of the user's feet always lands the ground. At this timing, the bottom of the other of the user's feet is applied with a loading by the entire weight of the user. When the loading applied onto the bottom of one of the user's feet during running or jogging is denoted by F2, the loading (pressure) F2, which is applied onto one of the user's feet when the user lands the ground during running, is expressed by an expression F2=m+mg, where F denotes the force, m denotes the user's weight, and g denotes the acceleration of gravity, since the user's body entirely leaves the ground and then lands the ground on one of his/her feet. Therefore, the loading (pressure) F2 repeatedly varies in the cycle of (m+mg) to (0) to (m+mg) to (0). Here, F2=m+mg=m (1+9.8)=10.8 m. Thus, the loading F2 applied onto the bottom of one of the user's feet while the user runs is approximately 10 times higher than the loading F1 applied onto the bottom of one of the user's feet while the user walks. In particular, the addition of mg, which is made by the acceleration of gravity during running contributes to increase the amount of the electric current produced, in the same manner as when a piezoelectric element of a piezoelectric lighter produces a higher amount of electric current when the piezoelectric element is applied with impulse with acceleration.

The force (loading) applied onto the piezoelectric electromotive unit 2A that is positioned below the bottom of the user's foot during walking (F1) takes a maximum value of m, and the force (loading) applied onto the piezoelectric electromotive unit 2A that is positioned below the bottom of the user's foot during running (F2) takes a maximum value of m+mg. Therefore, when T denotes the value in the intermediate region between F1 and F2, the relations F1<T<F2 and T=(F1+F2)/2 hold true. Thus, the value T can be used as a threshold level to completely separate the number of walking steps and the number of running steps. In addition, when is denotes the amount of electric current produced in response to the force (loading) T applied onto the piezoelectric electromotive unit 2A that is positioned below the bottom of the user's foot and i denotes the actual or measured amount of the electric current produced, walking and running can be completely distinguished and separately measured since the relation i<is indicates walking and is <i indicates running. Therefore, by continuously measuring the variation in the amount of the electric current i produced by the piezoelectric electromotive unit 2A that is positioned below the bottom of the user's foot, the measured amount of the electric current i can be converted into either the number of walking steps or the number of running steps. Since the amount of the produced electric current is always higher when the user runs than when the user walks and the relation i<ni (severalfold or more) holds true, the number of walking steps can be separately measured from the number of running steps by measuring the amount of the produced electric current i with the pedometer unit 6 and classifying the measured amount of the produced electric current.

Here, the measured amount of the electric current produced is may be classified by a comparator circuit into two categories including the number of walking steps and the number of running steps as described above, but the measured amount of the electric current produced is may be classified by a comparator circuit into three categories including the number of walking steps, the number of jogging steps, and the number of running steps and separately counted. This is because, when jogging and running are compared with each other, the loading applied onto the bottom of the user's foot when the user's foot lands the ground is higher during running and the amount of the electric current produced is accordingly higher during running. Thus, the number of running steps can be further classified into the number of jogging steps and the number of running steps.

As described above, the feature of separately measuring the number of walking steps and the number of running steps according to the present invention is accomplished by detecting the difference in loading applied onto a user's foot between when the user walks and between when the user runs. In particular, the inventors have made the present invention by noting that the user always lands on both feet while walking but always lands on one of his/her feet while running. If a human wants to quickly move forward on two legs, s/he strongly kicks the ground with one of his/her feet to move his/her body into the air forward. Thus, the human always land on one foot only. At this timing, the bottom of this one foot is applied with a loading (pressure) of F=m+mg, where m denotes the person's weight and mg denotes the acceleration of gravity. The present invention can separately detect walking and running based on the difference in loading (pressure) applied onto the bottom of this foot. Thus, the present invention is made utilizing the laws of nature to separately detect and measure walking and running. A conventional pedometer does not distinguish running from walking and merely detects and counts the number of steps, and thus does not separate the number of walking steps from the number of running steps. Accordingly, the conventional pedometer cannot accurately measure the number of walking steps and cannot measure the number of running steps separately from the number of walking steps. In particular, an acceleration sensor is too erroneous to accurately separate the number of walking steps and the number of running steps, and it has been difficult to separately measure the number of walking steps and the number of running steps.

According to the present invention, irrespective of whether a user walks or runs, when the user moves his/her foot down onto the ground and then moves the foot up, the loading (pressure) applied onto the piezoelectric electromotive unit 2A from the bottom of the user's foot is removed, and, at the same time, the loading (pressure applied onto the substrate 2a is also removed. Therefore, the flexible substrate 2a regains its original shape by itself, and the piezoelectric element 2b conformally regains its original shape. Accordingly, the state shown in FIG. 7A is regained. Between when the user moves his/her foot down onto the ground and when the user moves the foot up, the reverse electric current (see the left-pointing arrow) flows. Therefore, as shown in FIG. 13B, an electric current i flowing in one direction (see the right-pointing arrow) turns on an LED, and an electric current i flowing in the opposite direction (see the left pointing arrow) is measured by the pedometer unit 6 as one walking or running step.

FIGS. 9A to 9F illustrate exemplary embodiments where the piezoelectric element 2b integrally formed with the substrate 2a can be substantially bent when a user lands the ground to produce a large amount of electric current in the exemplary embodiments of the electromotive unit 2 shown in FIGS. 3A to 3D. In an exemplary embodiment shown in FIGS. 9A, 9B and 9C, two bow-shaped insert plates 2F are interposed with an appropriate spacing therebetween in parallel between the lower surface of the substrate 2a and the upper surface of the underlay 2E. Since there is a gap between the substrate 2a and the underlay 2E as shown in the drawings, when the user lands the ground on his/her foot, the substrate 2a is more substantially bent due to the gap and the piezoelectric element 2b integrally formed with the substrate 2a is also substantially bent. This creates a large amount of electric current. In another exemplary embodiment shown in FIGS. 9D, 9E and 9F, two bow-shaped insert plates 2F are interposed with an appropriate spacing therebetween in parallel between the lower surface of the underlay 2E and the upper surface of a shoe 7. Since there is a gap between the underlay 2E and the shoe 7 as shown in the drawings, when the user lands the ground on his/her foot, the underlay 2E and the substrate 2a placed thereon are more substantially bent due to the gap and the piezoelectric element 2b is also substantially bent. This creates a large amount of electric current. Here, the insert plates 2F to be interposed can have a thickness of, for example, 0.5 mm to 1.0 mm. In the exemplary embodiment shown in FIGS. 9D, 9E and 9F, the left and right separate insert plates 2F may be connected to each other with another plate therebetween.

Figure 10A:
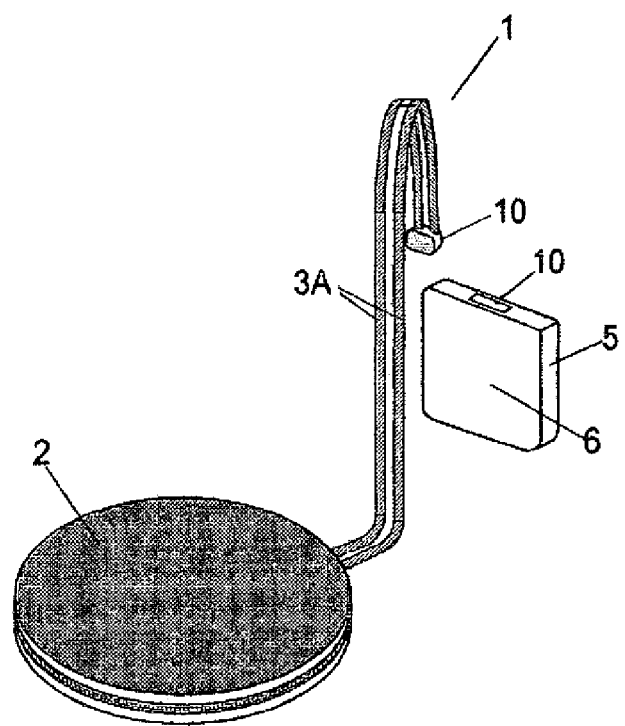
FIG. 10A is a perspective view illustrating one exemplary embodiment of the present invention.
Figure 10B:
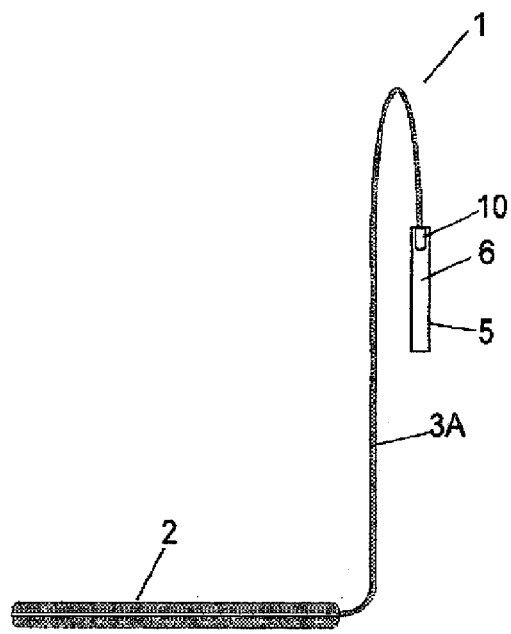
FIG. 10B is a side view illustrating one exemplary embodiment of the present invention.

FIGS. 10A and 10B illustrate an exemplary embodiment where the pedometer for a shoe relating to the present invention shown in FIGS. 2A to 2D is mounted onto a shoe in a different manner. According to this exemplary embodiment, the wire material 3 designed to deliver the electric power produced by the electromotive unit 2 is formed by a fixable wire material 3A made of a metal that is appropriately hard and rigid. A metal is an appropriately rigid and flexible material. Even if a metal is bent to some extent, the metal regains its original shape due to its rigidity and flexibility and thus retains its shape. While the wire material 3 relating to the previous exemplary embodiment is mounted onto a shoe by means of the fastener 4, the wire material 3 designed to deliver electric power relating to the present exemplary embodiment is alternatively formed by the fixable wire material 3A that includes electrically conductive wires and is made of an appropriately rigid and flexible metal. In this way, the pedometer for a shoe relating to the present exemplary embodiment can be fixed and mounted onto a shoe in such a manner that the fixable wire material 3A simply clips the edge of the shoe.

The fixable wire material 3A may be used to fix the pedometer onto a shoe in such a manner that an initially straight fixable wire material 3A may be bent along the edge of the shoe to clip the edge of the shoe, or in such a manner that a fixable wire material 3A may be bent in advance like a clip may clip the edge of a shoe. Such a fixable wire material 3A can play three roles, in other words, delivers the electric power produced by the electromotive unit 2, clips the edge of the shoe to fix the pedometer, and to connect to the pedometer unit 6 outside the shoe. The fixable wire material 3A substantially facilitates the implementation of the present invention. For example, the wire material 3 designed to deliver electric power may be entirely formed by the fixable wire material 3A, and only a portion of the wire material 3 that is fixed onto the edge of the shoe is formed by the fixable wire material 3A.

An electrically conductive metal material used to form the fixable wire material 3A can include, for example, an iron material, an aluminum material and the like that are appropriately rigid. The fixable wire material 3A may be shaped as a thin and flat strip as shown in the drawing, or shape as a line with a circular cross-section. The fixable wire material 3A may be entirely formed as a flat plate using an electrically conductive plastic or carbon material. Alternatively, the fixable wire material 3A may be formed by an appropriately flexible plastic material, and an electrical wire to conduct electricity may be arranged along the plastic material or molded in the plastic material. In either case, the electrical wire is not externally exposed within the shoe. Therefore, the electrical wire is not exposed to the tension caused by the movement of the shoe. According to the exemplary embodiments shown in FIGS. 10A and 10B, a connector 10 is provided on the end of the fixable wire material 3A, so that the fixable wire material 3A can be inserted into and removed from a connector 10 provided in the housing 5. Thus, the connectors 10 can be connected outside the shoe.

FIGS. 11A to 11C illustrate exemplary embodiments where the piezoelectric electromotive unit 2A constituting the pedometer for a shoe according to the present invention is disposed within an insole. Referring to FIG. 11A, the connector 10 is provided in the housing 5 having therein the pedometer unit 6, and the housing 5 is also provided with an USB terminal 11 to transfer data to a personal computer. With such a configuration, by disconnecting the connectors 10 to remove the housing 5 and connecting the USB terminal 11 to a personal computer, the data of the measured number of walking steps (or the number of running steps) can be managed on the personal computer every day. Alternatively, a recording medium 9 may be provided separately from the housing 5 and used to send the data of the measured number of walking steps (or the number of running steps) to the personal computer, so that the data can be managed on the personal computer every day. The recording medium 9 may be, for example, an SD card. The data may be transferred to the personal computer by means of infrared transmission or wireless transmission by the Bluetooth® technique, instead of the use of the recording medium 9.

FIGS. 11B and 11C illustrate another exemplary embodiment where the piezoelectric electromotive unit 2A constituting the pedometer for a shoe according to the present invention is disposed in an insole. FIG. 11B is a top view and FIG. 11C is a bottom view. The piezoelectric electromotive unit 2A is disposed within an insole 12, flat and thin connecting electrode surfaces 2G are connected to the respective electrodes of the piezoelectric electromotive unit 2A, and the connecting electrode surfaces 2G are extended and bent to reach the back surface of the insole 12 and affixed as shown in the drawing. According to this exemplary embodiment, simply by placing the insole 12 relating to the present exemplary embodiment in the shoe, the connecting electrode surfaces 2G come into contact with and are electrically connected to the electrode surfaces of the fixable wire material 3A shown in FIGS. 12A to 12D to achieve electrical conduction. The connecting electrode surfaces 2G shown in FIGS. 11A to 11C can be formed by, for example, a thin and flat aluminum foil or the like.

FIGS. 12A to 12D illustrate an exemplary embodiment of the fixable wire material 3A constituting the pedometer for a shoe relating to the present invention. The fixable wire material 3A, which is appropriately rigid and flexible and electrically conductive, is formed into the shape shown in the drawings in the present exemplary embodiment. At the end portion of the fixable wire material 3A, a planar (semicircular in the drawings) electrode surface is formed. The fixable wire material 3A clips the edge of the shoe and is thus fixed, and the planar (semicircular in the drawings) electrode surface is placed on the sole of the shoe. On the planar electrode surface, the surface of the connecting electrode surface 2G provided on the back surface of the insole 12 shown in FIGS. 11A to 11C is brought into contact and connected. In this way, the electric current produced by the electromotive unit 2 can be delivered outside the shoe.

The fixable wire material 3A can play three roles, in other words, delivers the electric power produced by the electromotive unit 2, clips the edge of the shoe to fix the pedometer, and to connect to and fix the pedometer unit 6 outside the shoe, as discussed above. In this way, the separate housing 5 having the pedometer unit 6 therein can be detachably attached. Therefore, the fixable wire material 3A enables the housing 5 having therein the pedometer unit 6 to be entirely attached detachably, removed from the shoe, or replaced. Since a surface contact is established between the planar connecting electrode surface 2G and the electrode surface of the fixable wire material 3A to connect them each other as described above, the connecting electrode surface 2G and the electrode surface of the fixable wire material 3A may be out of alignment with each other to some extent due to the pressure applied within the shoe by various back and forth and left and right movements of the foot or due to the pressure applied from above by the bottom of the user's foot, but can absorb the applied pressure using the misalignment. Thus, the electrical conduction (delivery) between the connecting electrode surface 2G and the electrode surface of the fixable wire material 3A can be maintained without being affected by the applied pressure.

Accordingly, unlike conventional pedometers that require lead (electrical) wires to be arranged in a shoe, the present invention does not cause failures such as wire breakage and poor or no connection. Since the surfaces in contact with each other can have appropriate areas, the contact resistance between these surfaces hardly changes and no poor connection occurs even if the surfaces in contact with each other are misaligned from each other to some extent. Rather, since the surfaces in contact with each other move away from each other and are rubbed against each other, the surfaces in contact with each other can be effectively prevented from rusting. If lead (electrical) wires are connected to each other within a shoe to fix the pedometer as in the conventional art, the wires are likely to cause failures such as breakage or poor or no connection since the lead or electrical wires are inevitably exposed to tension caused by various movements of the user's foot, and the wires are also easily susceptible to poor or no connection due to humidity and the like. For such reasons, the conventional pedometers have never been feasible.

Figure 12A:
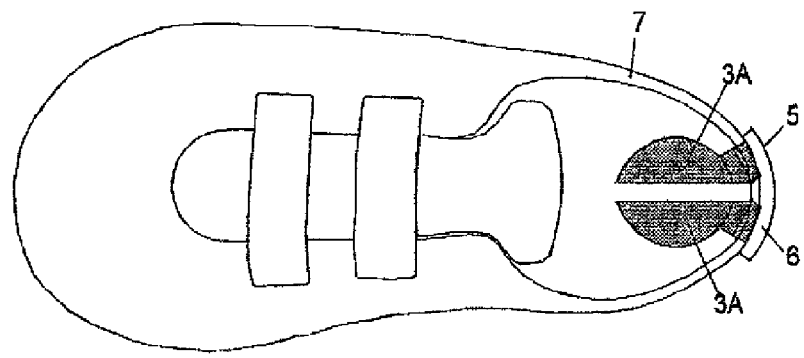
FIG. 12A is a plan view illustrating one exemplary embodiment of the present invention.
Figure 12B:
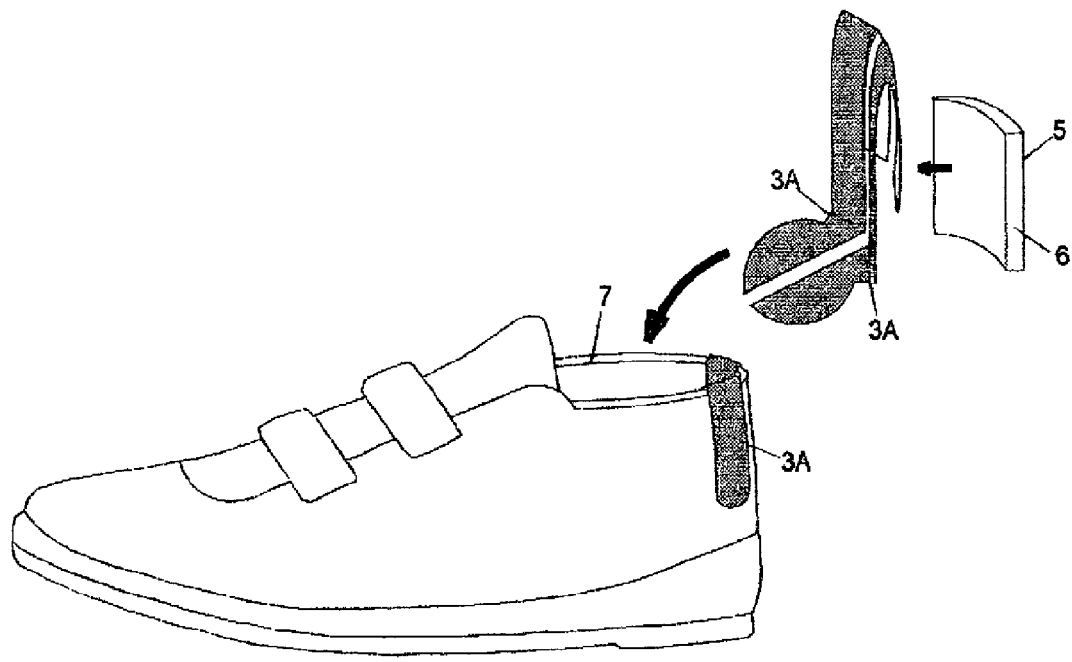
FIG. 12B includes a side view and a perspective view illustrating one exemplary embodiment of the present invention.
Figure 12C:
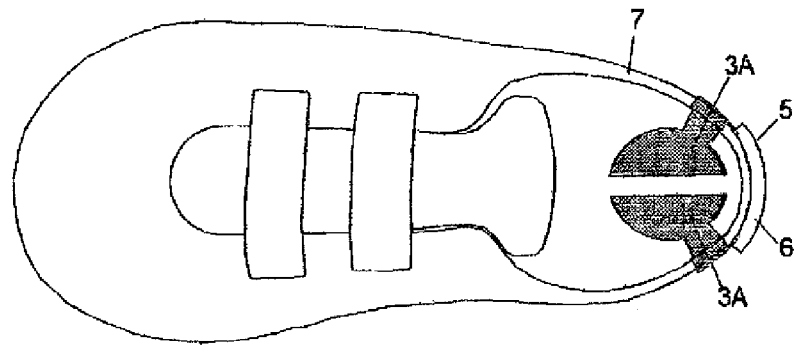
FIG. 12C is a plan view illustrating one exemplary embodiment of the present invention.
Figure 12D:
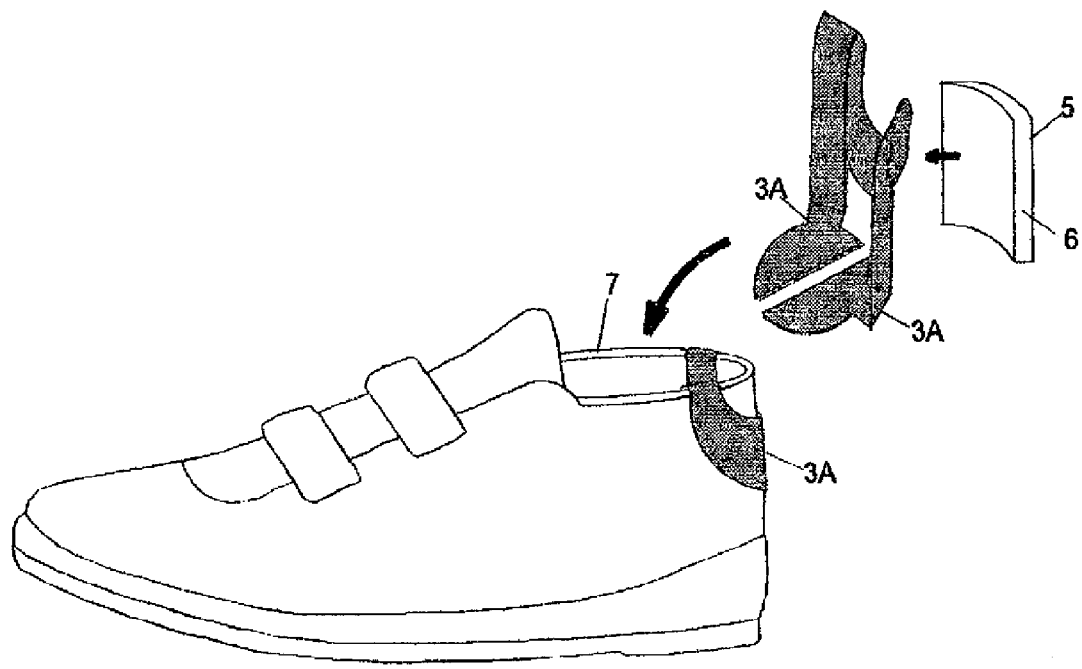
FIG. 12D includes a side view and a perspective view illustrating one exemplary embodiment of the present invention.

The fixable wire material 3A can be formed by a flat-plate-like aluminum, steel, electrically conductive plastic, or carbon material. Alternatively, as described above, an electrical wire may be arranged along or molded in the fixable wire material 3A. In addition, the fixable wire material 3A may be vaporized with aluminum, or deposited with electrically conductive carbon. At the end of the electrical wire, the planar electrode plate 2B may be connected as shown in FIGS. 3A to 3D, so that the electrode plate 2B can be connected to the connecting electrode surface 2G through a surface contact therebetween to establish electrical conduction. In addition to the exemplary embodiment where the housing 5 can be detachably inserted into and removed from the fixable wire material 3A, another exemplary embodiment is possible where the housing 5 can be made detachable in a different manner (for example, fitting). In FIGS. 12A and 12B, the fixable wire material 3A clips the back edge of the shoe, and in FIGS. 12C and 12D, the fixable wire material 3A clips the side edge of the shoe. Therefore, the fixable wire material 3A does not interfere with the user when the user wears the shoe.

FIG. 13A illustrates an exemplary embodiment of the pedometer unit 6 constituting the pedometer for a shoe according to the present invention. The electric current produced by the piezoelectric electromotive unit 2A can be measured (counted) by a measuring section 6a in the form of a pulse signal, and the measured (counted) number is immediately displayed in a display section 6b. A data storing section 6d operates in synchronization with a clock section 6c to store therein data in association with a timing, and stores the number of walking steps and/or the number of running steps achieved within every hour, day, or week. A data recording section 6e then records the data stored in the data storing section 6d into the recording medium 9. By A/D converting the level of the pulse signal measured by the measuring section 6a, the detected electric current can be separated into the data indicating the number of walking steps and the data indicating the number of running steps depending on the level of the electric current as shown in FIGS. 7B and 7C. Therefore, the pedometer unit 6 can display and manage the number of walking steps and the number of running steps within one day, one week or one month. Here, every person has a different weight, and the loading applied onto the electromotive unit 2 when the person walks or runs and the electric current produced vary depending on the weight. Therefore, the weight of the user is input through a manipulating section 6f to compensate for the influence of the user's weight. In this way, the influence of the user's weight can be compensated for and accurate measurement can be made. By inputting the number of walking steps and the number of running steps measured into a personal computer through the recording medium 9 or the USB terminal 11, the user can calculate and manage, in association with every day, week and month, the time of period of walking and running, the travel distances by walking and running, the amounts of calories spent by walking and running, the amounts of fat combusted during walking and running, and the like.

The power source for the pedometer unit 6 can be realized by a button or coin battery. Such a battery is consumed only to detect and display the electrical signal produced by the electromotive unit 2, and can thus achieve a substantially longer lifetime compared with the power source of a conventional pedometer. Furthermore, the pedometer unit 6 can be turned on when detecting the electric current produced by the electromotive unit 2 or vibration, so that the pedometer unit 6 can normally remain in the turned-off state. On the insole 12 and the overlay 2D described in the previous exemplary embodiment, protrusions may be formed to stimulate the bottom of a foot and the protrusions may apply electrical stimuli to the bottom of a foot. A solar cell and a normal battery are used together, and electric power provision may be switched in such a manner that the solar cell drives the pedometer unit 6 during day and the normal battery drives the pedometer unit 6 during night. In this way, the consumption of the normal battery can be reduced as much as possible. The normal battery may be replaced with a rechargeable battery, and the rechargeable battery may be charged using the solar cell while the solar cell is not used during day and the chargeable battery may be used during night. In this way, the pedometer unit 6 can be used semi-permanently without a power supply.

As discussed above, the pedometer for a shoe according to the present invention can be mounted on any ready-made shoe, the flat-plate-like electromotive unit 2 placed within the shoe can produce an electric current by a user's steps while the user walks or runs, and the electromotive unit 2 can operate without a power source due to the electric current produced by the piezoelectric electromotive unit 2A. The pedometer for a shoe according to the present invention can measure separately the number of walking steps and the number of running steps unlike conventional portable pedometers, and can perform measurement without errors since the electrical signal produced by the electromotive unit when it is directly stepped on is counted.

Figure 14A:
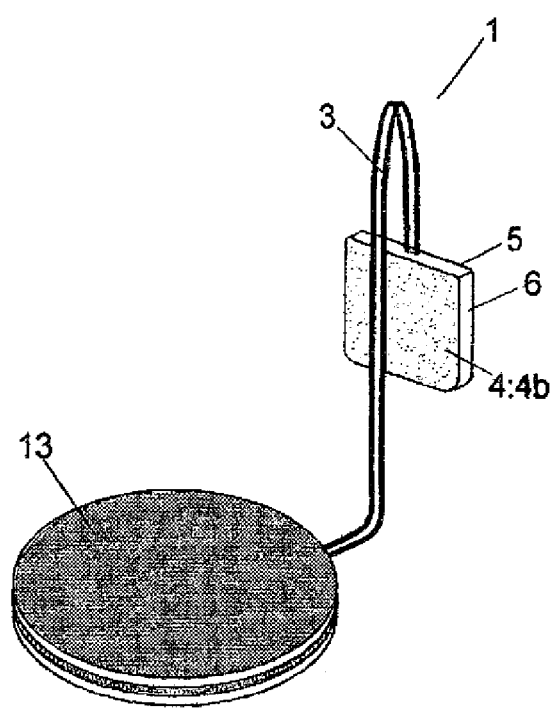
FIG. 14A is a perspective view illustrating one exemplary embodiment of the present invention.
Figure 14B:
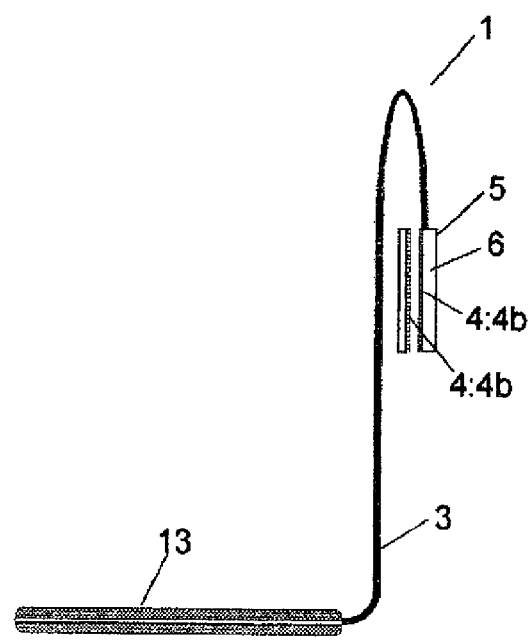
FIG. 14B is a side view illustrating one exemplary embodiment of the present invention.

FIGS. 14A to 16B illustrate an exemplary embodiment where the pedometer for a shoe according to the present invention includes a pressure detector 13, which is configured to detect variation in pressure applied by a user's steps while the user walks or runs. As shown in FIGS. 14A and 14B, the pressure detector 13 is formed like a flat plate, and placed and mounted on the bottom of the shoe within a small space in the shoe. Thus, the pressure detector 13 does not interfere with the user when the user wears the shoe and walks and does not make the user feel uncomfortable. As shown in FIG. 5B, the wire material 3 is connected to the pressure detector 13 and arranged in an empty space within the shoe. Here, the wire material 3 has a play portion. This prevents the wire material 3 from being applied with tension when pressure occurs due to various movements of the foot in the shoe. Accordingly, the wire material 3 does not break or suffer from poor or no connection in the shoe. The wire material 3 is guided outside the shoe, fixed and mounted on the edge of the shoe using the fastener 4, and connected to the pedometer unit 6 outside the shoe. In this way, the pedometer according to the present exemplary embodiment can be mounted on a ready-made shoe similarly to the previous exemplary embodiment. FIG. 15A illustrates an exemplary embodiment where the pressure detector 13 is disposed in the insole 12. When a user's foot is placed on the pressure detector 13 and applies a loading (pressure) from the bottom of the foot, the pressure detector 13 is applied with a pressure and can detect variation in the electrical signal produced according to the applied pressure. Since the pressure detector 13 is formed like a flat plate and appropriately elastic and flexible, the pressure detector 13 can absorb the pressure applied from the bottom of the user's foot by the user's steps and the user can wear the shoe without feeling uncomfortable.

Figure 14C:
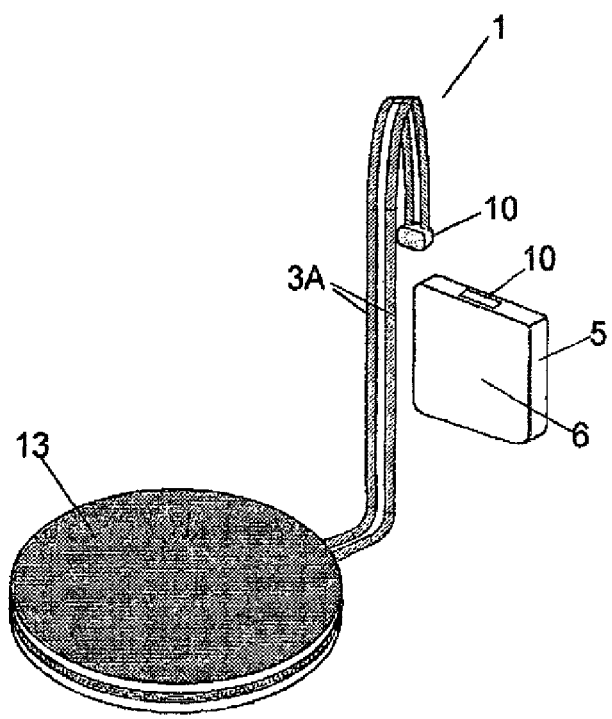
FIG. 14C is a perspective view illustrating one exemplary embodiment of the present invention.
Figure 14D:
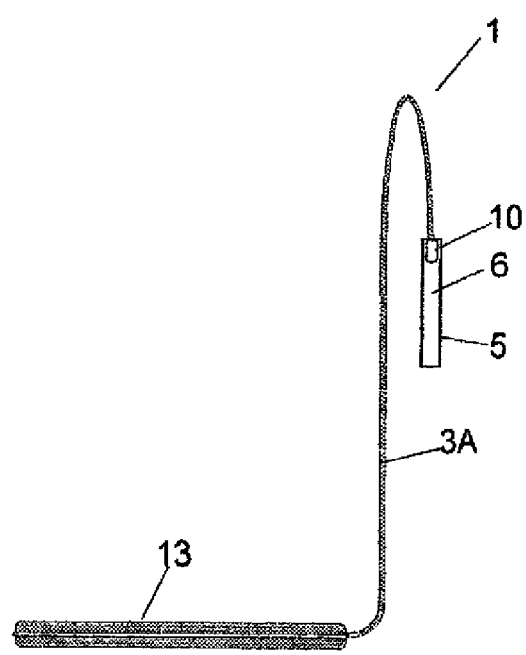
FIG. 14D is a side view illustrating one exemplary embodiment of the present invention.

FIGS. 14C and 14D illustrate an exemplary embodiment where the fixable wire material 3A, which is made of an electrically conductive metal material with appropriate rigidity and flexibility is used, instead of using the fastener 4 to mount the wire material 3 onto the shoe as in the previous exemplary embodiment. As discussed above, the fixable wire material 3A can play three roles, in other words, delivers the detected signal from the pressure detector 13 to the pedometer unit 6, clips the edge of the shoe to fix the pedometer, and to connect to and fix the pedometer unit 6 outside the shoe.

Figure 15A:
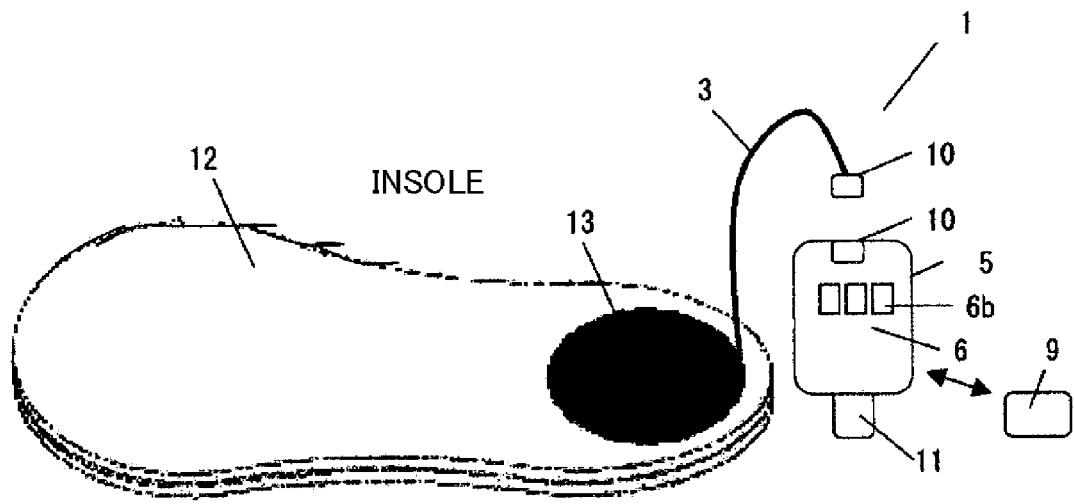
FIG. 15A is a perspective view illustrating one exemplary embodiment of the present invention.
Figure 15B:
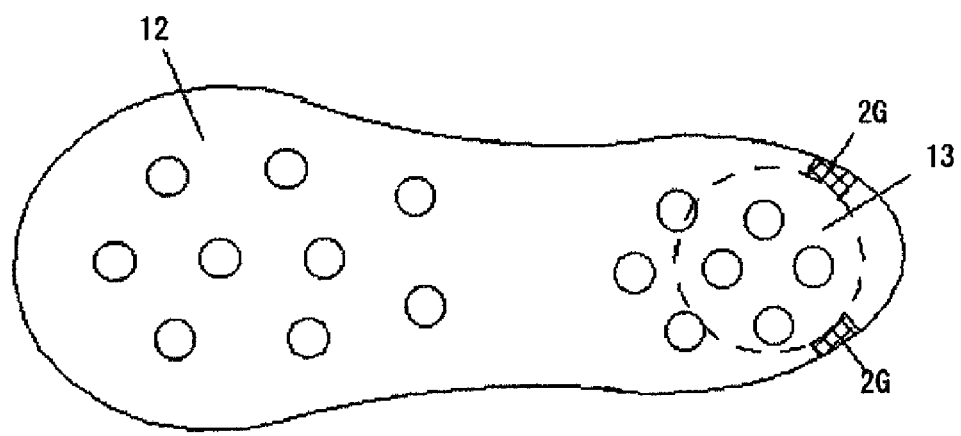
FIG. 15B is a partial plan view illustrating one exemplary embodiment of the present invention.
Figure 15C:
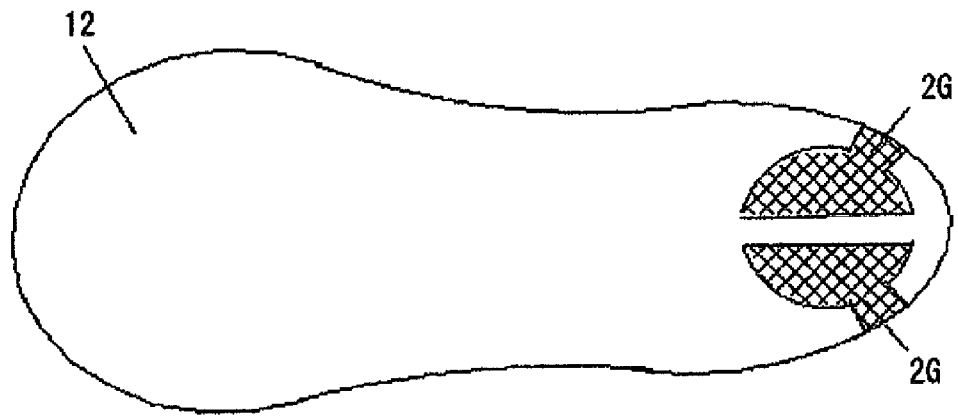
FIG. 15C is a partial plan view illustrating one exemplary embodiment of the present invention.

FIGS. 15B and 15C illustrate an exemplary embodiment where the pressure detector 13 is disposed within the insole 12. Similarly to the exemplary embodiment shown in FIGS. 11A to 11C, the thin and flat connecting electrode surfaces 2G are connected to the respective electrodes of the pressure detector 13, and extended and bent to reach the back surface of the insole 12 and affixed as shown in the drawing. With such a configuration, as described above with reference to FIGS. 12A to 12D, electrical connection can be established simply by bringing the electrode surface of the fixable wire material 3A into contact with the electrode surfaces of the connecting electrode surfaces 2G. Thus, electrical conduction can be maintained without any failures such as wire breakage and poor or no connection.

Figure 16A:
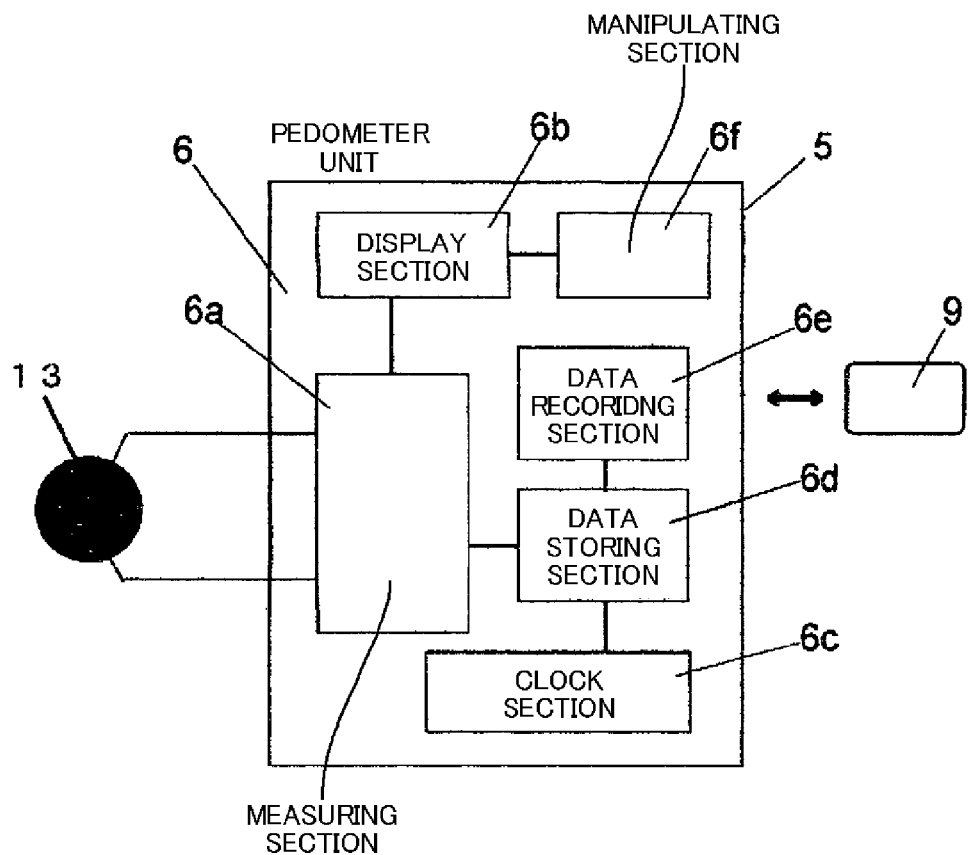
FIG. 16A is a partial block diagram illustrating one exemplary embodiment of the present invention.
Figure 16B:
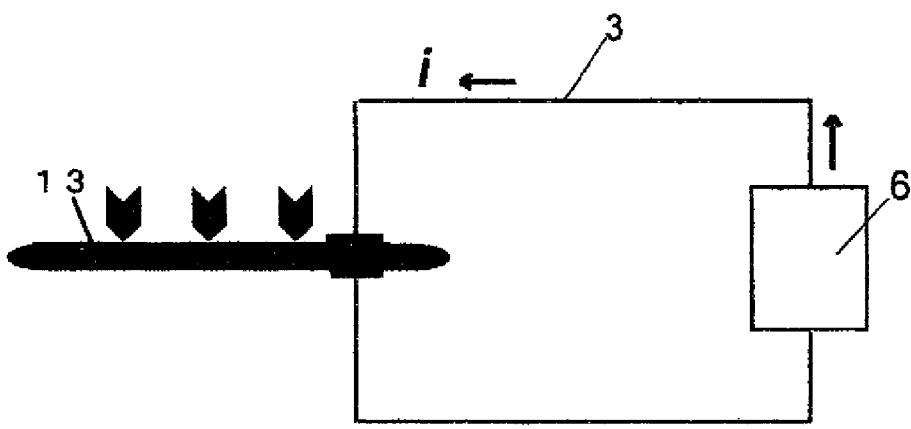
FIG. 16B includes a partial side view and a circuit diagram illustrating one exemplary embodiment of the present invention.

FIGS. 16A and 16B illustrate an exemplary embodiment where the number of walking steps and the number of running steps are measured using the pressure detecting section 13. As described above, when a user walks or runs, a pressure is applied from the bottom of the user's foot as the user moves the foot down onto the ground to move forward. The pressure (loading) applied from the bottom of the foot is approximately 10 times higher when the user runs than when the user walks because of the acceleration of gravity as described in detail with reference to FIGS. 7A to 7C and FIGS. 17A and 17B. Therefore, the pressure detector 13 can separately measure (count) the number of walking steps and the number of running steps by detecting whether the pressure is applied or not and the level of the pressure. The pressure detector 13 can be formed by a pressure sensor that is configured to detect an applied pressure. The pressure detector 13 can be configured to detect a pressure by utilizing, for example, resistance, electrostatic capacitance, and electromagnetic induction, and is operable to convert, into an electrical signal, the extent of deformation of an elastic member caused by a pressure applied to the elastic member. The impedance used to detect the extent of deformation is one of three options, including resistance, capacitance, inductance. When the pressure detection is performed by using resistance, variation in electrical resistance caused by an applied pressure is converted into an electrical signal. For example, a metal resistance strain sensor and a semiconductor resistance strain sensor use resistance. The metal resistance strain sensor can be realized by a strain gauge where narrow metal wires or a metal foil is affixed onto paper or a plastic film. In either case, the metal resistance stain sensor can be formed thin and flat and favorably applied to embody the present invention.

The semiconductor resistance strain sensor uses a resistance of a semiconductor and can achieve a higher sensitivity than the metal resistance stain sensor. When the pressure detection is performed by using electrostatic capacitance, variation in electrostatic capacitance caused by an applied pressure is converted into an electrical signal. The resistance value varies according to the applied pressure, and the variation (increase and decrease) in the resistance value caused by the applied pressure is detected by using a Wheatstone bridge. Thus, when the pressure detector 13 is applied with an electric current or voltage using the circuit shown in FIG. 16B, the potential output from the pressure detector 13 varies in proportion to the applied pressure and accurate measurement can be made. The sensor designed to detect a pressure can be made of NiCu alloy, a semiconductor Si, a ceramic, an electrically conductive rubber or the like.

The present invention may be configured mountable on a ready-made shoe, but may also be incorporated into a shoe before the completion of the shoe. A conventional pedometer mountable on a shoe mainly has the following two problems as described above. When a lead wire is arranged within a shoe, a pressure occurring in the shoe applies tension onto the lead wire. In this case, the wire is likely to suffer from breakage, poor connection or no connection. Secondly, the conventional pedometer cannot distinguish walking and running from each other. The present invention, however, can provide a pedometer for a shoe that overcomes the above-mentioned two problems.

What is claimed is:

1. A device comprising:
   a pressure detector mountable on a shoe and operable to detect a variation in pressure exerted by a loading of a body applied from a bottom of a foot corresponding to the body;
   a fixable wire configured to deliver a signal representing the variation in pressure detected by the pressure detector, the fixable wire including a portion that is configured to be fixed onto a desired portion of the shoe; and
   a pedometer unit operable to receive the signal through the fixable wire;
   wherein the pedometer unit detects the signal representing the variation in pressure exerted on the pressure detector by the loading applied from the bottom of the foot and measures a number of steps based on the detected signal;
   wherein the pressure detector is electrically connected to the fixable wire through contact only, without fixing the fixable wire to the pressure detector.

2. The device as set forth in claim 1, wherein
   the pressure detector is electrically connected to the fixable wire through contact between surfaces of a pair of electrodes of the pressure detector and surfaces of a pair of electrodes of the fixable wire, wherein the surfaces of the electrodes of the pressure detector are not fixed to the surfaces of the electrodes of the fixable wire.

3. The device as set forth in claim 2, wherein the pressure detector is provided in an insole and the pair of planar electrode surfaces of the pressure detector are exposed on an underside of the insole.

4. The device as set forth in claim 2, further comprising an insole configured to be attached onto an inside of the shoe, wherein the pressure detector is disposed in the insole.

5. The device as set forth in claim 1, wherein
   the pedometer unit is operable to separately measure a number of walking steps and a number of running steps depending on an amount of the variation represented by the detected signal.

6. The device as set forth in claim 5, wherein
   data representing a weight of the body is prestored, and
   the number of walking steps and the number of running steps are measured by compensating for fluctuation in the signal produced by the loading from the weight of the body applied from the bottom of the foot.

7. The device as set forth in claim 1, wherein the portion of the fixable wire is a folded portion, and wherein the signal is delivered from an inside of the shoe to an outside of the shoe.

8. The device as set forth in claim 7, wherein a portion of the folded portion is outside of the shoe, and the pedometer unit is provided at the portion.

9. The device as set forth in claim 7, wherein the folded portion is configured to be clipped on one of a side edge and a back edge of the shoe.

10. The device as set forth in claim 7, further comprising an insole configured to be attached onto the inside of the shoe, wherein the pressure detector is disposed in the insole, the pressure detector including a pair of electrodes, each electrode having a surface disposed on the insole.

11. The device as set forth in claim 1, wherein the pressure detector includes a piezoelectric element.

12. The device as set forth in claim 1, wherein the pressure detector includes a flexible substrate.

13. The device as set forth in claim 12, wherein the pressure detector includes at least one of an overlay and an underlay, at least one of the overlay and the underlay made of an electrically conductive rubber material.

14. The device as set forth in claim 1, further comprising a solar cell configured to drive the pedometer unit.

15. The device as set forth in claim 1, wherein the fixable wire is a substantially plate-like material positioned against an inside side of the shoe.

16. The device as set forth in claim 1, wherein the pedometer unit is configured to generate data based on the number of steps that are measured and wirelessly transmit the data using at least one of Bluetooth and infrared.

17. The device as set forth in claim 16, wherein the pedometer unit is configured to generate data based on the number of steps that are measured and store the data on a memory.

18. The device as set forth in claim 1, wherein the fixable wire is made of a substantially rigid material.

19. The device as set forth in claim 1, wherein an electrically conductive wire is molded in the fixable wire.

20. The device as set forth in claim 1, wherein the fixable wire is formed using an electrically conductive material.

21. The device as set forth in claim 1, wherein the fixable wire includes one of an electrically conductive wire and an electrically conductive film.

22. A device comprising:
    an insole including a pressure detector configured to deliver a signal representing a variation in pressure through a fixable wire to a pedometer unit, the insole configured to be inserted into a shoe;
    wherein the pressure detector is electrically connected to the fixable wire through contact only, without fixing the fixable wire to the pressure detector.

23. The device as set forth in claim 22, wherein the pressure detector includes a piezoelectric element.

24. The device as set forth in claim 22, wherein
    the pressure detector is electrically connected to the fixable wire through contact between surfaces of a pair of electrodes of the pressure detector and surfaces of a pair of electrodes of the fixable wire, wherein the surfaces of the electrodes of the pressure detector are not fixed to the surfaces of the electrodes of the fixable wire.

25. A device comprising:
    a pressure detector mountable on a shoe and operable to detect a variation in pressure exerted by a loading of a body applied from a bottom of a foot corresponding to the body;
    a fixable wire configured to deliver a signal representing the variation in pressure detected by the pressure detector, the fixable wire being a substantially plate-like material positioned against an inside side of the shoe, the fixable wire including a portion that is configured to be detachably fixed onto a desired portion of the shoe; and
    a pedometer unit operable to receive the signal through the fixable wire;

wherein the pedometer unit detects the signal representing the variation in pressure exerted on the pressure detector by the loading applied from the bottom of the foot and measures a number of steps based on the detected signal.

26. The device as set forth in claim 25, wherein the pressure detector is electrically connected to the fixable wire through contact only, without fixing the fixable wire to the pressure detector.

27. The device as set forth in claim 25, wherein
the pressure detector is electrically connected to the fixable wire through contact between surfaces of a pair of electrodes of the pressure detector and surfaces of a pair of electrodes of the fixable wire, wherein the surfaces of the electrodes of the pressure detector are not fixed to the surfaces of the electrodes of the fixable wire.

28. The device as set forth in claim 27, wherein the pressure detector is provided in an insole and the pair of planar electrode surfaces of the pressure detector are exposed on an underside of the insole.

29. The device as set forth in claim 27, further comprising an insole configured to be attached onto the inside of the shoe, wherein the pressure detector is disposed in the insole.

30. The device as set forth in claim 25, wherein
the pedometer unit is operable to separately measure a number of walking steps and a number of running steps depending on an amount of the variation represented by the detected signal.

31. The device as set forth in claim 30, wherein
data representing a weight of the body is prestored, and
the number of walking steps and the number of running steps are measured by compensating for fluctuation in the signal produced by the loading from the weight of the body applied from the bottom of the foot.

32. The device as set forth in claim 25, wherein the portion of the fixable wire is a folded portion, and wherein the signal is delivered from the inside of the shoe to an outside of the shoe.

33. The device as set forth in claim 32, wherein a portion of the folded portion is outside of the shoe, and the pedometer unit is provided at the portion.

34. The device as set forth in claim 32, wherein the folded portion is configured to be clipped on one of a side edge and a back edge of the shoe.

35. The device as set forth in claim 32, further comprising an insole configured to be attached onto the inside of the shoe, wherein the pressure detector is disposed in the insole, the pressure detector including a pair of electrodes, each electrode having a surface disposed on the insole.

36. The device as set forth in claim 25, wherein the pressure detector includes a piezoelectric element.

37. The device as set forth in claim 25, wherein the pressure detector includes a flexible substrate.

38. The device as set forth in claim 37, wherein the pressure detector includes at least one of an overlay and an underlay, at least one of the overlay and the underlay made of an electrically conductive rubber material.

39. The device as set forth in claim 25, further comprising a solar cell configured to drive the pedometer unit.

40. The device as set forth in claim 25, wherein the pedometer unit is configured to generate data based on the number of steps that are measured and wirelessly transmit the data using at least one of Bluetooth and infrared.

41. The device as set forth in claim 40, wherein the pedometer unit is configured to generate data based on the number of steps that are measured and store the data on a memory.

42. The device as set forth in claim 25, wherein the fixable wire is made of a substantially rigid material.

43. The device as set forth in claim 25, wherein an electrically conductive wire is molded in the fixable wire.

44. The device as set forth in claim 25, wherein the fixable wire is formed using an electrically conductive material.

45. The device as set forth in claim 25, wherein the fixable wire includes one of an electrically conductive wire and an electrically conductive film.

* * * * *